US010699536B1

(12) United States Patent
Schoner

(10) Patent No.: US 10,699,536 B1
(45) Date of Patent: *Jun. 30, 2020

(54) REGISTRY VERIFICATION OF ITEM IDENTITY FOR A MECHANIZED STORE

(71) Applicant: Standard Cognition Corp., San Francisco, CA (US)

(72) Inventor: Bernd Schoner, Cambridge, MA (US)

(73) Assignee: Standard Cognition Corp., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,395

(22) Filed: Nov. 21, 2019

Related U.S. Application Data

(63) Continuation of application No. 16/217,442, filed on Dec. 12, 2018, which is a continuation-in-part of application No. 15/853,252, filed on Dec. 22, 2017, now Pat. No. 10,192,408, which is a continuation of application No. 15/495,555, filed on Apr. 24, 2017, now Pat. No. 9,886,827.

(60) Provisional application No. 62/326,931, filed on Apr. 25, 2016, provisional application No. 62/486,665, filed on Apr. 18, 2017, provisional application No. 62/612,317, filed on Dec. 29, 2017, provisional application No. 62/640,018, filed on Mar. 8, 2018, provisional application No. 62/696,990, filed on Jul. 12, 2018, provisional application No. 62/776,038, filed on Dec. 6, 2018.

(51) Int. Cl.
*G06K 15/00* (2006.01)
*G07G 1/00* (2006.01)
*G06Q 10/08* (2012.01)

(52) U.S. Cl.
CPC ......... *G07G 1/0045* (2013.01); *G06Q 10/087* (2013.01)

(58) Field of Classification Search
CPC .......................... G07G 1/0045; G06Q 10/087
USPC .................................................. 235/383, 379
See application file for complete search history.

(56) References Cited

U.S. PATENT DOCUMENTS

| 8,577,705 | B1 | 11/2013 | Baboo et al. |
| 9,911,290 | B1 | 3/2018 | Zalewski et al. |
| 10,165,194 | B1 | 12/2018 | Baldwin |
| 10,192,408 | B2 * | 1/2019 | Schoner ............... G07G 1/0045 |
| 2008/0159634 | A1 | 7/2008 | Sharma et al. |
| 2015/0019391 | A1 | 1/2015 | Kumar et al. |
| 2015/0039458 | A1 | 2/2015 | Reid |
| 2015/0222861 | A1 | 8/2015 | Fujii et al. |
| 2015/0262116 | A1 | 9/2015 | Katircioglu et al. |

(Continued)

OTHER PUBLICATIONS

Non-Final Office Action dated Nov. 27, 2019 in related U.S. Appl. No. 16/217,442, 5 pgs.

*Primary Examiner* — Thien M Le
(74) *Attorney, Agent, or Firm* — Kilpatrick Townsend & Stockton LLP

(57) ABSTRACT

Registry verification is used in a mechanized store. One or more sensors are used to identify one or more items available for purchase at display in a store. One or more cameras are used to detect identities of the one or more items removed by a user from the display. Identities of the one or more items identified by the one or more sensors are compared to the identities of the one or more items detected by the one or more cameras to obtain a result that is saved to a record of the user. The user can be charged for the items removed from the display.

20 Claims, 13 Drawing Sheets

(56) References Cited

U.S. PATENT DOCUMENTS

| | | |
|---|---|---|
| 2016/0162715 A1 | 6/2016 | Luk et al. |
| 2016/0358145 A1 | 12/2016 | Montgomery |
| 2017/0323376 A1 | 11/2017 | Glaser et al. |
| 2018/0070056 A1 | 3/2018 | DeAngelis et al. |
| 2018/0150788 A1 | 5/2018 | Vepakomma et al. |
| 2019/0147709 A1 | 5/2019 | Schoner |

* cited by examiner

Merchant Database 902

| User Session ID | User ID | Encrypted AIDC | Encrypted Sensor Data | Entry Time | Exit Time | Session Location | Result | Ledger Pointer |
|---|---|---|---|---|---|---|---|---|
| abc123 | bjack | HZDADGF | GDAFDA | 12:06 @ 11/30/2018 | 12:16 @ 11/30/2018 | Airport 1 | Item 1: Removed | Block 1 |
| abc234 | awash | DFGSZDGF | DFGEGIO | 9:00 @ 11/30/2018 | 9:20 @ 11/30/2018 | Hotel 1 | Item 2: Removed; Item 3: Displaced | Block 2 |

User Database 904

| User Session ID | User ID | Encrypted Sensor Data | Entry Time | Exit Time | Session Location | Result | Ledger Pointer |
|---|---|---|---|---|---|---|---|
| abc123 | bjack | FFFFGR | 12:06 @ 11/30/2018 | 12:16 @ 11/30/2018 | Airport 1 | Item 1: Removed | Block 1 |
| abc234 | awash | DOLOFIG | 9:00 @ 11/30/2018 | 9:20 @ 11/30/2018 | Hotel 1 | Item 2: Removed; Item 3: Displaced | Block 2 |

FIG. 9

REGISTRY VERIFICATION OF ITEM IDENTITY FOR A MECHANIZED STORE

CROSS-REFERENCES TO RELATED APPLICATIONS

This application is a continuation of U.S. patent application Ser. No. 16/217,442, filed Dec. 12, 2018, entitled "Registry Verification For A Mechanized Store Using Radio Frequency Tags," which application is a continuation-in-part application of U.S. patent application Ser. No. 15/853,252, filed on Dec. 22, 2017, entitled "Registry Verification For A Mechanized Store Using Radio Frequency Tags," now U.S. Pat. No. 10,192,408, issued Jan. 29, 2019, which application is a continuation of U.S. patent application Ser. No. 15/495,555, filed on Apr. 24, 2017, entitled "Registry Verification For A Mechanized Store," now U.S. Pat. No. 9,886,827, issued Feb. 6, 2018, which application claims the benefit of U.S. Patent Application No. 62/326,931, filed on Apr. 25, 2016, and U.S. Patent Application No. 62/486,665, filed on Apr. 18, 2017. U.S. application Ser. No. 16/217,442 also claims the benefit of U.S. Patent Application No. 62/612,317, filed on Dec. 29, 2017, entitled "Distributed Ledger For Retail Transactions," U.S. Patent Application No. 62/640,018, filed Mar. 15, 2018, entitled "Distributed Ledgers Protecting Privacy In Physical Transactions," U.S. Patent Application No. 62/696,990, filed Jul. 12, 2018, entitled "Registry Verification For A Mechanized Micro Market," and U.S. Patent Application No. 62/776,038, filed on Dec. 6, 2018, entitled "Method and System for a Smart Display." The disclosures of these applications are hereby incorporated by reference in their entirety for all purposes.

BACKGROUND

This disclosure generally relates to registers. Registers are used to record and/or verify transactions. Registers include machines and systems for ascertaining a number of movements of various devices or products. Some registers are used to disclose a numerical quantity. Some examples of registers include cash-registers, fare-registers, voting machines, and calculators, which have registering or counting elements and may have additional certain other features for a given purpose.

Traditionally, retail transactions have taken place in a well-defined physical store with both a representative of the retail store (the merchant) and the shopper (the consumer) present. The consumer typically picks specific products from shelves or fridges. At the end of the picking activity the shopper proceeds to the cash register and pays for the merchandise in a person-to-person transaction with a store associate. Traditionally, the presence of the store associate is necessary to execute payment and/or to prevent shoppers from stealing.

BRIEF SUMMARY

Store associates are costly, they are difficult to manage, and they effectively limit the period of time that the store is open for business. Thus, there is a need in the art for methods and systems for automatically or semi-automatically operating a retail store. The present disclosure enables the operation of a store where only the shopper is present and/or where the number of store associates is reduced.

The present disclosure relates generally to methods and systems for autonomous and secure physical transactions. More particularly, some embodiments relate to identifying a shopper, providing physical store access to the shopper, identifying the products the shopper removes from shelves, creating a digital shopping basket corresponding to a physical shopping basket, and/or automatically or semi-automatically charging the shopper for items in the shopping basket.

In some embodiments, benefits are achieved over conventional techniques. For example, some embodiments provide methods and systems to operate a retail store unattended, to allow shoppers to shop outside normal operating hours, to operate a store with only a security guard present, to reduce shop lifting and theft, to operate a store without a cash register, to provide easy access to merchandise for delivery services, and/or to operate stores securely in public or semi-public places, such as hotels, shopping malls, airports, train stations, sidewalks and pedestrian areas, schools or universities, and on public transport vehicles.

In some embodiments, a system using registry verification for a mechanized store with permitted access comprises: a structure enclosing an area, wherein the structure is configured to permit access of a plurality of potential users to the area; one or more displays in the area; a plurality of items for sale located at the one or more displays, wherein the plurality of items are mapped to a code configured to be read by a scanning device; one or more cameras configured to count a number of items in a registry removed by a user from the one or more displays; and one or more processors. The one or more processors are configured to: receive a number of items scanned from the scanning device; receive the number of items removed counted by the one or more cameras; compare the number of items scanned to the number of items removed to obtain a compared value (sometimes referred to as a result); and saving the compared value to a record of the user.

In some embodiments, the one or more displays comprises a first display and a second display; a first item of the plurality of items is located at the first display; a second item of the plurality of items is located at the second display; the camera is further configured to: record that the first item was removed from the first display and record that the second item was removed from the second display. In some embodiments, the one or more processors are configured to update a first electronic basket and a second electronic basket; the first electronic basket corresponds to the number of items removed by the user; and the second electronic basket corresponds to the number of items scanned. In some embodiments, the one or more cameras are configured to count the number of items without identifying the user; the one or more cameras are configured to count the number of items without identifying items; the one or more cameras are configured to count the number of items by identifying movement of a hand and determining if the hand is holding an item; the structure is configured to permit only one user at a time access to the area; the area is a volume less than 3.5 meters wide by 3.5 meters long by 3.5 meters tall; the area is a volume less than 1.5 cubic meters; the structure lacks climate control to control the climate of the area; the system further comprises a Bluetooth receiver configured to unlock doors of the structure based on a received Bluetooth signal; and/or the cameras are configured to use artificial intelligence for determining if an item was taken from a display of the one or more displays.

In some embodiments, a method for using registry verification for a mechanized store comprises: permitting a user access to a structure enclosing an area; counting, using one or more cameras, a number of items removed from one or more displays by a user; tracking, in a registry, the number of items removed; receiving a number of items scanned by a scanner; comparing the number of items in the registry to the number of items scanned to obtain a result; and saving the result to a record of the user. In some embodiments, the method further comprises alerting a store owner, store employee, independent contractor, and/or law enforcement based on the compared result being a negative number, such that the number of items removed is greater than the number of items scanned; tracking the user in the area; and/or transmitting an indication to the user that the compared result is zero, such that the number of items removed equals the number of items scanned. In some embodiments, the scanner is a mobile device belonging to the user and/or counting the number of items removed from one or more displays by a user is performed without identifying the items removed. In some embodiments, a memory device comprising instructions that when executed cause one or more processors to perform the method steps.

In some embodiments, a method for determining items removed from a display is described. In some embodiments the method comprises one or more of the steps: creating a video recording of the display using a video camera directed at the display; analyzing frequency components of frames of the video recording; selecting a plurality of frames of the video recording based on the plurality of frames having higher frequency components than other frames in the video recording; subtracting a background in the plurality of frames; detecting a hand in the plurality of frames; resolving, in the plurality of frames, if the hand holds an object; recording state vectors corresponding to the plurality of frames based on resolving if the hand holds an object in the plurality of frames; and detecting that the object was removed from the display based on the state vectors and a time sequence of the plurality of frames. In some embodiments, detecting the hand in the plurality of frames comprises comparing movement in foreground of the plurality of frames to determine which part of the foreground has more movement than another part of the foreground.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 9 depicts an exemplary user database and merchant database according to one or more embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Some embodiments relate to methods and systems for operating a store or market place where only one party of the transaction is physically present. Some embodiments relate to acquiring imaging data of an object using an imaging tool, acquiring imaging data of a person, unlocking a physical container based on the identity of the person, and/or executing a transaction relative to a specific object or ensemble of objects. For example, a traditional retail store can operate unattended with only a shopper is present in the store. In some embodiments, structures, such as cabinets or physical rooms, function as a micro market where shoppers transact a product purchase in a self-serve fashion.

Figure 1:
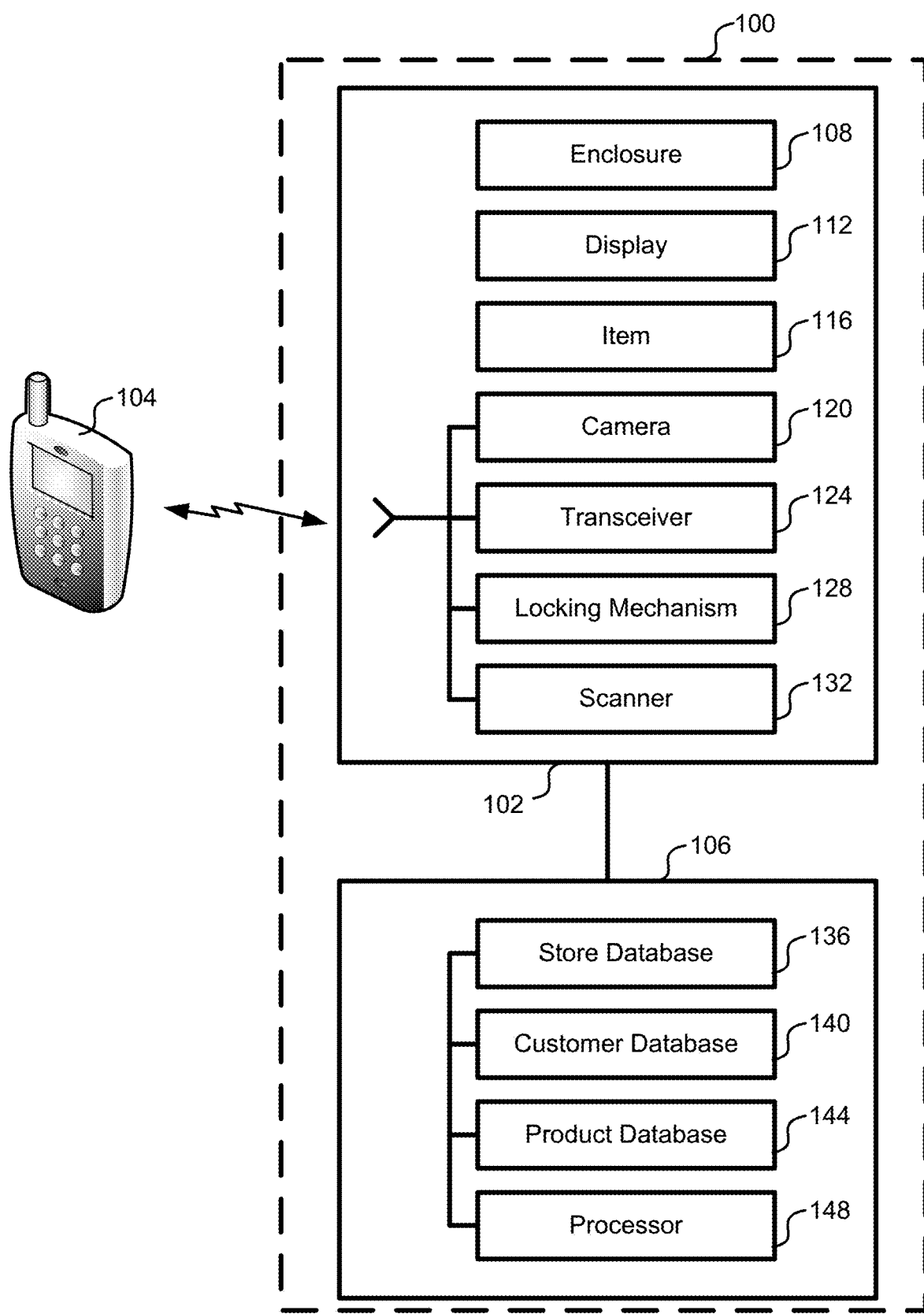
FIG. 1 depicts a block diagram of an embodiment of a system for using registry verification for a mechanized store.

Referring first to FIG. 1, a block diagram of an embodiment of a system 100 for using registry verification for a store 102 is shown. In some embodiments, a user's mobile device 104 is used to interact with the system 100. In some embodiments, the system 100 comprises the mobile device 104. The mobile device 104 is a computing device small enough to be held and operated in a hand of the user. A smartphone is an example of a mobile device. The mobile device 104 comprises one or more of: a device display, a wireless transmitter, a wireless receiver, device data storage, device processing unit, an imaging sensor, an RF sensor, a position sensor, and/or an authentication system (e.g., a passcode for operating the mobile device and/or a biometric sensor).

The system comprises the store 102 and a processing unit 106. The store 102 comprises an enclosure 108, a display 112, an item 116, a camera 120, a transceiver 124, a locking mechanism 128, and/or a scanner 132. The processing unit 106 comprises a store data base 136, a customer database 140, a product database 144, and/or a processor 148. In some embodiments, the processing unit 106 comprises one or more processors 148. The one or more processors 148 can be split between one or more locations. For example, there can be a local processor 148 and a remote processor 148, which are both part of the processing unit 106.

The display 112 is used to present the item 116 for sale. In some embodiments, the display 112 is a shelf. The item 116 comprises a label (e.g., an optical identifier such as a barcode and/or QR code), an RF identifier, and/or distinctive packaging. The item 116 is mapped to a product, description, and/or price by the label, RF identifier, and/or distinctive packaging.

The camera 120 is used to observe a shopper removing the item 116 from the display 112. The locking mechanism 128 is used to permit the shopper access to the item 116. The shopper, or a store employee, uses the scanner 132, and/or the mobile device 104, to scan the item 116 (e.g., to scan the optical identifier attached to or associated with the item 116). Of course, the system 100 can comprise a plurality of enclosures 108, displays 112, items 116, cameras 120, transceivers 124, locking mechanisms 128, and or scanners 132.

In some embodiments, the mobile device 104 is used to authenticate a shopper. Authentication can happen using a wireless connection between the mobile device 104 and the transceiver 124. Authentication can happen using a positioning sensor which associates a location of the shopper next to, or inside, the enclosure 108 of the store 102. Authentication can happen using an image sensor or visual sensor associated with the enclosure 108 (e.g., camera 120) or the mobile device 104. Authentication can also happen using a biometric sensor that is associated with the store 102 or the mobile device 104.

Upon authentication of the shopper, the shopper is granted physical access to the item 116. The enclosure 108 comprises a door. The door is locked by the locking mechanism 128. In some embodiments, the locking mechanism 128 includes a wireless lock, a camera enabled lock, a barcode reader enabled lock, and/or a remote-controlled lock. The locking mechanism 128 could be based on a number of different wireless protocols such as Bluetooth, Bluetooth low energy (BLE), Bluetooth Smart, WiFi, Near Field Communication, and/or Radio Frequency IDentification (RFID).

After the shopper has been granted physical access, the shopper removes or adds items 116 from one or more displays 112. A display 112 is a location where an item for purchase, rent, and/or transfer of ownership is placed on or near. In some embodiments, the display 112 is a storage location. The shopper removes the item 116 from the display 112 in order to purchase the item. In a case of a store worker or supplier, items 116 are placed in and/or on the display 112 for restocking. A user is someone or something that adds and/or removes items 116 from one or more displays 112. Examples of users include shoppers, store workers, contractors, suppliers, and robots. As activities to place and remove an item 116 from a display 112 occur, one or more cameras 120 record the activities of the user. The images captured are processed by a processing unit 106 (e.g., a local processing unit and/or a remote processing unit; a processing unit can comprise one or more processors and one or more data storage devices).

In some embodiments, images captured are analyzed to count a number of items 116 being removed and/or added to one or more displays 112. At an end of a store visit, the processing unit 106 has a count of how many items 116 the user removed or added to one or more displays 112. In some embodiments, the processing unit 106 tracks in a registry the count of how many items 116 the user removed or added.

In some embodiments, images captured are analyzed to identify items 116 that are being removed or added to the display 112. At the end of the store visit, the processing unit 106 has an accurate list of which items 116 the user removed or added to the one or more displays 112. In some embodiments, images captured are analyzed to identify from which display 112, and/or part of a display 112, an item 116 is being removed and on which display 112, and/or part of a display 112, an item 116 is being replaced. At an end of a store visit, the processing unit 106 has an accurate list of where items 116 remaining are located in the store (e.g., to alert a store employee to put an item 116 back where it belongs).

Identification of an item 116 is accomplished using one or any of the following mechanisms: an image sensor collocated with a user's personal mobile device 104, a camera 120 or cameras 120 installed in the store 102 location, optical barcode scanning software, radio frequency identification, machine learning technology such as recognition software using a neural network, and/or water marking on the product's packaging. In some embodiments, images are being analyzed using reinforcement learning, convolutional neural networks, image segmentation, adversarial networks, residual learning, residual networks, and/or optical flow analysis.

In some embodiments, a record of items 116 is assembled in a digital shopping cart by algorithms based on visual imagery of the items 116. In some embodiments, a record of items 116 is assembled in the digital shopping cart through a use of RFID tag readers sensing a removal of RFID-enabled items 116 from the display 112. In some embodiments, the user assembles a record of items 116 in the digital shopping cart by scanning the items 116 with a mobile device 104. In some embodiments, the user assembles a record of items 116 in the digital shopping cart by scanning individual items 116 with the scanner 132 collocated with the display 112 and/or in another part of the store 102.

Upon completion of the shopping activity, payment is executed based on the items 116 in the digital shopping cart of the shopper. Payment can be triggered by a number of different events, including the shopper leaving the store 102, the location of the shopper being sensed outside the physical store 102, the shopper scanning her mobile device 104 at an exit point (e.g., at the door), the shopper passing a beacon tag, the shopper pushing a button, the shopper talking into a microphone, etc.

In some embodiments, two digital baskets are used: a first digital basket and a second digital basket. The first basket is a record of what the shopper presents for purchase (e.g., what is scanned for purchase). For example, the shopper uses her mobile device 104 to scan a bar code for each item 116 the shopper intends to purchase; and/or the shopper uses a barcode reader at a location (e.g., near a front of the store 102; or near the door). The barcode, or other identifying technology, may be collocated with the items 116 and/or with the display 112. The second digital basket comprises a count of items removed or added by the user (e.g., as counted using cameras 120). The processing unit 106 counts how many items 116 the shopper has removed or added to one or more displays 112, independently of how many items 116 the shopper presents for checkout. As the shopper creates a physical shopping basket containing physical product, the processing unit 106 keeps track of a count of products in the second digital basket by visually tracking the activities of the shopper in the store 102.

After the shopper presents her items 116 for check out, the processing unit 106 compares the count of items 116 in the first digital basket to the count of items 116 in the second digital basket. If the count is higher in the first digital basket than in the second digital basket, the processing unit 106 may transmit a message to the shopper to verify and make sure that she is not paying for too many products. On the other hand, if the count in the first digital basket is lower compared to the second digital basket, the system may ask the shopper to verify and make sure that she is not taking more product with her than she is paying for. In the case of behavior that suggests fraud, the system can also take more drastic measures such as asking a store representative to intervene with the shopper before and/or after she leaves the store. In an extreme case, the system may inform law enforcement directly and/or as quickly as possible.

In some embodiments, counting items 116 for the second digital basket is accomplished with a number of possible methods and/or combinations thereof. For example, a sequence of images of the shopper are analyzed. Individual frames are analyzed to determine if a hand handling an item 116 is present in the frame. If an item 116 is detected in the hand, previous and subsequent frames are analyzed to determine if the item 116 was removed or added to the display. Accordingly, a count of the second digital basket is increased or decreased. In some embodiments, sequences of frames are analyzed by a recurring neural network. In some embodiments, an individual frame, or sequence of frames, is analyzed to determine if more than one item 116 is handled by the shopper. This information is used to accurately manipulate the count of the second digital basket.

In some embodiments, the enclosure 108 is configured to permit only one shopper at a time to be in the store 102 and shop. Access to the store 102 is controlled through a Bluetooth activated automatic entry door. Cameras 120 are installed (e.g., in a ceiling) for the purpose of monitoring the shopping activity.

In some embodiments, a shopper is tracked through the store to obtain a complete count of the shopping activities in the store 102 relative to an individual shopper. Tracking can be done visually using more than one camera 120, where the system uses visual information about the shopper such as an appearance of her clothing, her face, or physical appearance. Tracking can also done by and/or assisted by wireless signals, such as Bluetooth beacons, WiFi signals, modulated light, and/or by signals based on other wireless or optical protocols. Some of the tracking mechanisms contemplated here rely on the shopper's mobile device 104 as either the source of the tracking signal and/or a recipient of a tracking signal.

Figure 2:
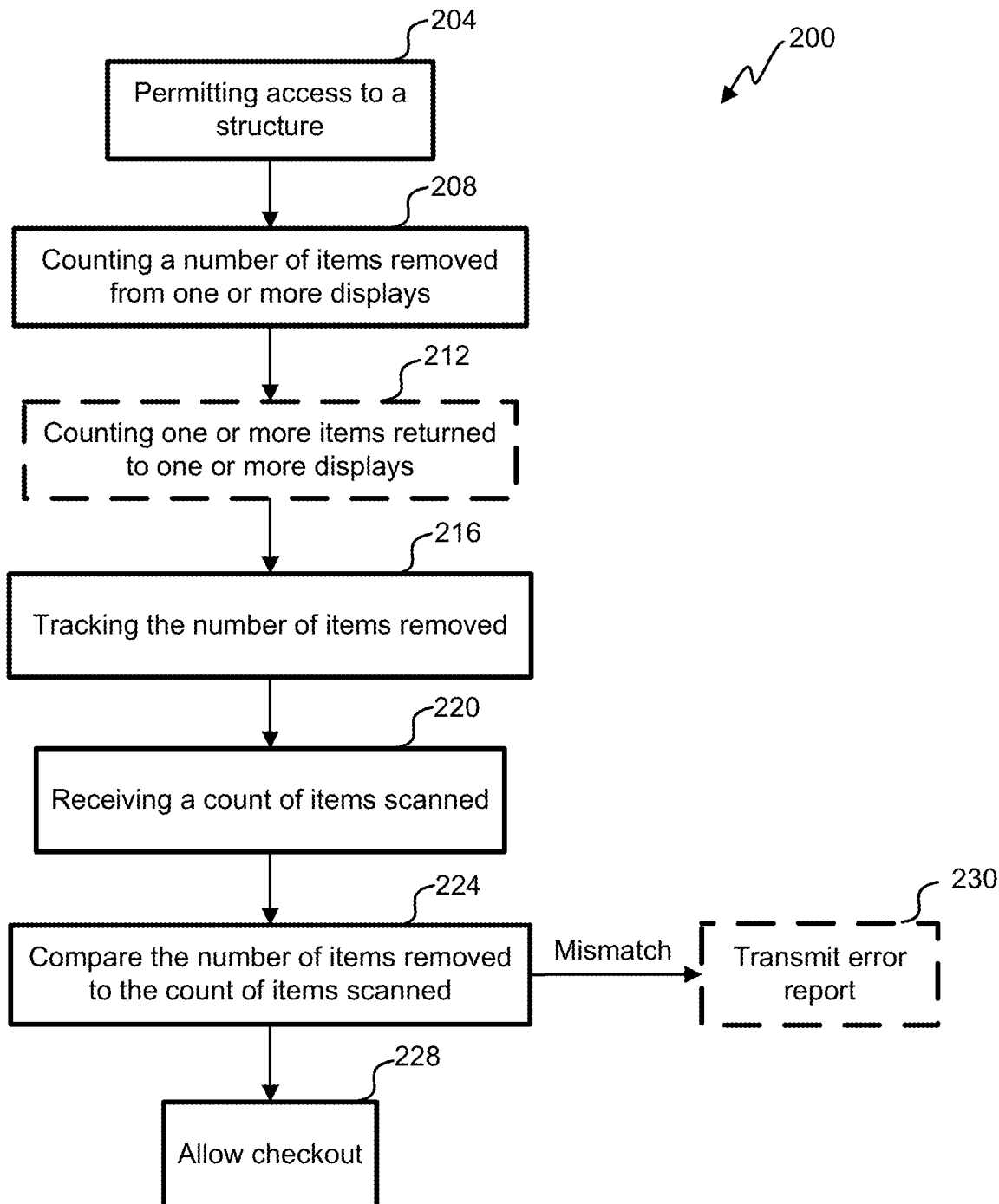
FIG. 2 illustrates a flowchart of an embodiment of a process for using registry verification for a mechanized store with permitted access.

Referring next to FIG. 2, a flowchart of an embodiment of a process 200 for using registry verification for a mechanized store is illustrated. Process 200 begins in step 204 with permitting access to a structure (e.g., the enclosure 108). The structure encloses an area. In some embodiments, "area" generally means a designated space, such as a volume, unless indicated to the contrary. In some embodiments, the structure is large enough that the user walks into the structure. In some embodiments, the structure is or resembles a traditional retail store. In some embodiments, permitting access allows a user to reach into the structure (e.g., for a store display, such as a fridge, or for vending on public transportation). In some embodiments, permitting access comprises receiving a signal (e.g., a radio frequency signal and/or optical signal). In some embodiments, the signal is transmitted from a mobile device 104 of a shopper. A lock is unlocked, based on receiving the signal. In some embodiments, the signal comprises a code and the code is authenticated.

In step 208, a number of items 116 removed from one or more displays 112 are counted. One or more cameras 120 are used to count the number of items 116 removed. For example, the one or more cameras 120 record a shopper removing items 116 from a shelf. Video images are analyzed to determine that an item 116 was removed. In optional step 212, the one or more cameras 120 are used to count items 116 that are returned to one or more displays 112.

In step 216 the number of items 116 removed are tracked in a registry. The registry receives a +1 for an item 116 counted as removed from a display 112 and a −1 for an item 116 that is returned to a display 112. In some embodiments, the register comprises an integer value (e.g., a value of the number of items 116 removed). In some embodiments, the register tracks only one value, the integer value. In some embodiments, the register tracks further details about an item 116 removed, such as a display 112 that the item 116 was removed from and/or an identification of the item 116 (e.g., a soda can).

In step 220, a number of items 116 scanned by a scanner 132 and/or the mobile device 104 are received by the processing unit 106. In some embodiments, the scanner 132 is affixed in the store 102 (e.g., next to a display 112, and/or the item 116 is held up to a camera 120 and the camera reads a label on the item 116, in addition to counting that the item 116 was removed from the display 112). In some embodiments, the scanner 132 identifies each item 116 and transmits a list of the items 116 scanned. And the number of items 116 scanned is received by counting items on the list.

In step 224, the number of items 116 removed, which is tracked by the registry, is compared to the number of items 116 scanned to obtain a result. The result is saved to a record of the user. For example, the number of items 116 removed is 7 and the number of items 116 scanned is 7. Thus the result is zero, and the result, which is a good result, is saved to the record of the user.

In step 228, the user is allowed to check out if the result is zero. In some embodiments, if the result is zero, then an indication is sent to the user that the number of items 116 removed matches the number of items 116 scanned.

In optional step 230, an error report is transmitted. In some embodiments, if the result is non-zero an error report is transmitted. For example, if the result is less than zero, then the user is notified that she might have scanned an item 116 more than once. If the result is greater than zero, then the user is notified to check her items 116 to see if one or more items 116 have not been scanned. In some embodiments, if the result is greater than zero then a store employee receives the error report. In some embodiments, a user is allowed to check out even though the result is non-zero.

In some embodiment, before a shopper enters a store, at a time the shopper enters the store 102, and/or before the shopper removes an item 116, the processing unit 106 ranks the shopper on a scale of trustworthiness so that the processing unit 106 can predict how likely the shopper is to commit fraudulent activity. Before the shopper leaves the store 102, the processing unit 106 has evidence of potential wrong doing by the shopper on the shopper's particular shopping trip. Video, recorded by the cameras 120, can be reviewed to verify fraudulent activity or to confirm trustworthy behavior by a shopper (e.g., after a store employee receives the error report in step 230).

In an example implementation, the store first encourages the shopper to sign up for an account with the system using her smartphone. The shopper uses her smartphone to scan a code attached to the outside wall of the store which takes her to a website. The shopper is now able to download the system's smartphone app. The shopper starts the app and then enters her name, address, and phone number. She also enters credit card or bank account credentials. The system checks the validity of the shopper's credentials and determines how much credit is available on the credit card and/or in the bank account. If the credit is above a certain threshold, the shopper's account is activated and immediately available for use.

In the example implementation, the shopper then pushes a 'door open' button on the app. This causes the shopper's smart phone to emit an encrypted Bluetooth beacon signal. The signal is received by the Bluetooth receiver connected to the door locking mechanism 128. Upon receiving the authenticated beacon signal, the receiver causes the door to unlock and open. The shopper enters and the door closes behind her. The system then formally opens the shopping session tied to the account of the shopper. There are three "shopping baskets" as part of the system: basket 1 (B1), basket 2 (B2), and basket 3 (B3).

Basket 1 (B1) reflects the physical basket of products the shopper has removed from the product display area. B1 is described by N1, the number of items in basket B1, and P1, the vector containing the identifiers of all the product p1_i located in B1. The term basket is used as an abstract description for products removed from the display(s). B1 may in fact be a shopping basket, or it may be a bag or container brought along by the shopper, or it may be the location of the shopper's pants pockets.

Basket 2 (B2) reflects the first digital basket of products the shopper has scanned for purpose of checking out items. B2 is described by N2, the number of items in basket B2, and P2, the vector containing the identifiers of all the product p2_i located in B2. The shopper creates P2 by physically scanning an optical code on products (the barcode) with her smart phone using an imager of the smart phone. As a default, each time a code is scanned, the corresponding product is added to the first digital shopping basket and N2 is increased by one. The smartphone display provides feedback to the shopper as to which products have been scanned so far. If a shopper makes a mistake, or decides to put a product back on the shelf, she can adjust the list P2 using the touchscreen on the smartphone. In another mode, the shopper can scan a barcode to remove the product from the list instead of adding it.

Basket 3 (B3) reflects the activities of the shopper as observed and estimated by the camera system. B3 is described by N3, the estimated number of items in basket B1, and P3, the vector containing the estimated identifiers of all the product p3_i located in B1. As soon as the shopping sessions starts, the system constantly updated and estimates B3 based on the set of sensor information available to the system (e.g., images and frames transmitted from cameras installed in the store and/or RF reads from RF readers).

In the example implementation, the shopper is instructed to pick an item, one by one, scan it with her mobile phone (the mobile phone being considered a scanner), and place it in the shopping basket (B1). If she wants to put a product back after having scanned it, she can hand edit the shopping list to do so. At any time, the shopper can select a checkout option on the mobile phone. After choosing checkout, the shopper leaves the store and the store door locks behind her. Payment is executed.

In the example implementation, after the shopper selects checkout, the system compares B3 to B2 and/or N3 to N2. The system can draw several conclusions from the comparison. If N2=N3: The estimated number of products picked (N3) matches the number of product in the digital shopping basket N2. The system assumes that the transaction was correct and that the shopper paid for everything she took. The transaction is complete.

If N2>N3: The estimated number of products picked (N3) is smaller than the number in the digital shopping basket. The system provides feedback to the shopper, asking her to make sure she did not double scan any items. The shopper has another opportunity to review her physical shopping basket (B1) and her digital shopping basket (B2) and make any corrections if appropriate to B2. Then N3 and N2 are compared once again and payment is executed based on the content of B2.

If N3>N2: The estimated number of products picked (N3) is larger than the number in the digital shopping basket. In this case, the system assumes that the shopper will pay for less product than she intends to take with her. The system can take one or more of the following measures:

Alert the shopper of a mismatch and ask her to check the first digital shopping basket (B2).

Notify a store manager or law enforcement that fraud may be underway.

Instruct a store associate to examine the shopper's physical basket (B1).

Instruct a person to review the video footage of the shopping activity.

If there is enough evidence of theft (e.g., through video), charge the shopper's credit card for the items that were not scanned.

Decrease a trust score of the shopper.

B1 and B2 are shopping lists created by the shopper. B1 is created through the physical product picking by the shopper. B2 is created by the scanning and editing of products on the shopper's smart phone. In contrast B3 and N3 are created by the system. They system estimates as accurately as possible B1 and/or N1.

Figure 3A:
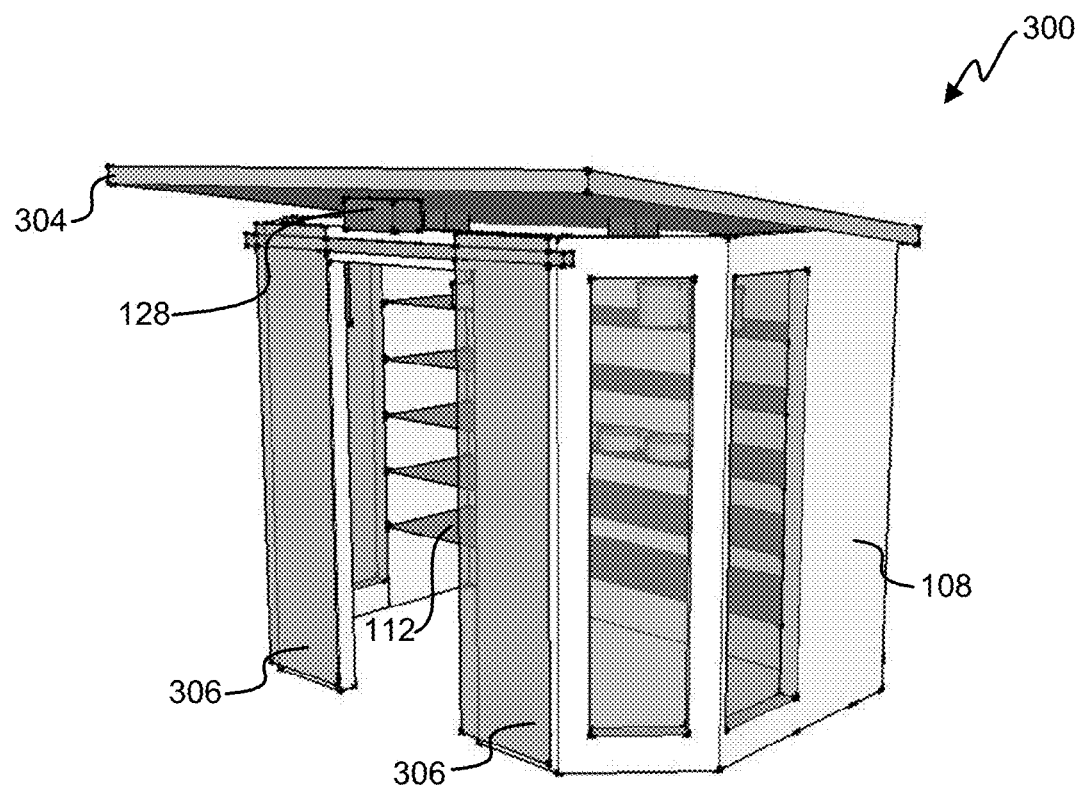
FIGS. 3A and 3B depict simplified drawings of an embodiment of a mechanized store using registry verification.
Figure 3B:
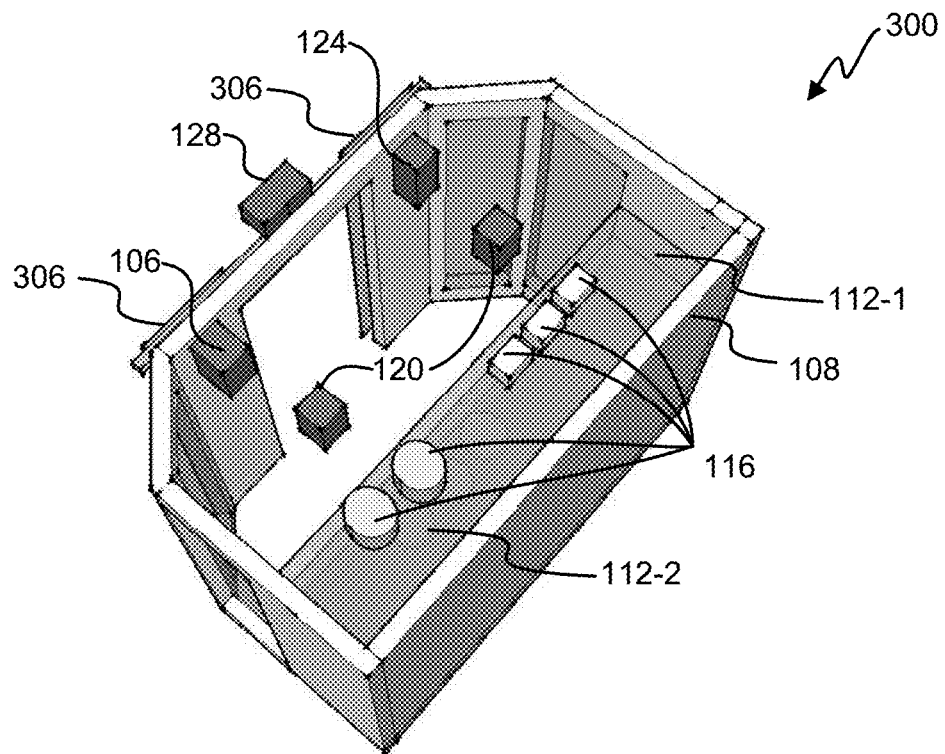

FIGS. 3A and 3B depict simplified drawings of an embodiment of a mechanized store 300, which uses registry verification. FIG. 3A is a perspective view. FIG. 3B is a top view with a roof 304 of the mechanized store 300 removed to show further details. The mechanized store 300 comprises a structure (enclosure 108) enclosing an area, one or more displays 112, a plurality of items 116, cameras 120, a transceiver 124, a locking mechanism 128, and a processing unit 106.

The structure comprises the roof 304 and doors 306. Items 116 for sale are on displays 112. There is a first display 112-1 and a second display 112-2. The cameras 120 track a number of items 116 removed or added to each display 112.

In some embodiments, the structure is configured to permit only one user at a time access to the area and/or only one user is observed in a small area at a time. In some embodiments, the area is a volume less than 3.5 meters wide by 3.5 meters long by 3.5 meters tall. In some embodiments, the area is less than 1.5 cubic meters (e.g., vending described in FIG. 5 below). In some embodiments, the structure lacks climate control to control a climate of the area (though a display 112 may have climate control for items in the display 112, such as cooling a beverage). In some embodiments, the structure is lightweight (e.g., as opposed to a concrete structure) and/or has an upscale feel (e.g., so that the structure can be placed at a pedestrian location of a city). A structure allowing only a single-shopper, sometimes referred to as a walk-in vending machine, reduces complexity of computer algorithms and/or a number of cameras 120 as compared to a structure that permits multiple shoppers at one time. In some embodiments, a shopper doesn't have to be tracked, just observed in a small area, reducing complexity of computer algorithms.

Figure 4:
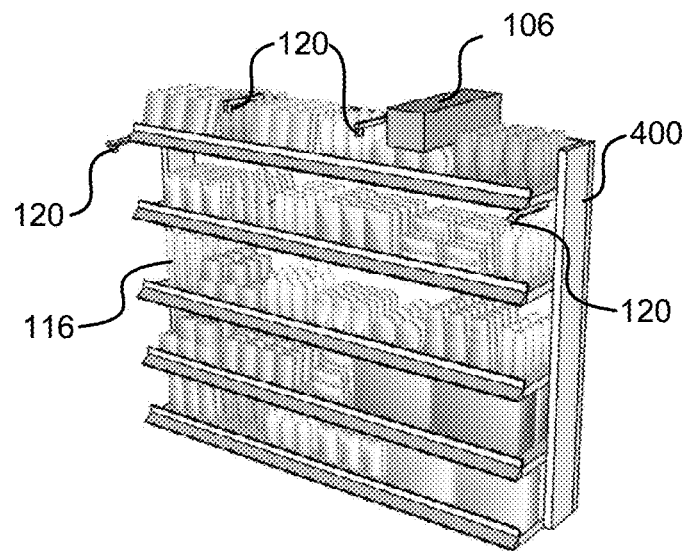
FIG. 4 depicts a simplified drawing of a shelf unit in a store using registry verification.

FIG. 4 depicts a simplified drawing of a shelf unit 400 in a store 102 using registry verification. Cameras 120 are mounted on the shelf unit 400. Items 116 for sale are on the shelf unit 400. Not all items 116 are labeled in FIG. 4 for simplicity. A processing unit 106 is mounted on the shelf unit 400. The cameras 120 observe a shopper removing items 116. In some embodiments, the scanner 132 is integrated with the processing unit 106 so that a shopper can scan items 116 at the processing unit 106. In some embodiments, a transceiver 124, a camera 120, and/or a locking mechanism 128 is integrated with the processing unit 106. In some embodiments, the shelf unit 400 is part of a mechanized store.

Figure 5:
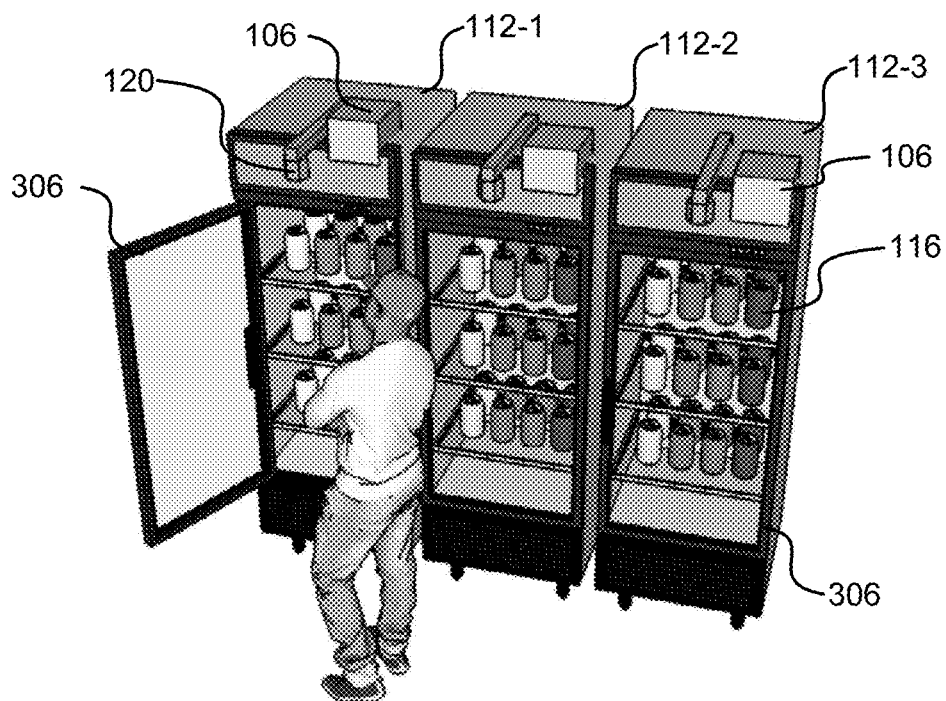
FIG. 5 depicts a simplified drawing of another embodiment of a structure using registry verification.

FIG. 5 depicts a simplified drawing of another embodiment of a structure using registry verification. In some embodiments, the structure enclosing the area is a cabinet and/or a micro market with one or more cameras 120. In FIG. 5 a first display 112-1, a second display 112-2, and a third display 112-3 are shown. Each display 112 in FIG. 5 is a structure and each comprises a door 306, a camera 120, and a processing unit 106. Not every feature is labeled for simplicity to not crowd the figure. A transceiver 124 is integrated with the processing unit 106. A locking mechanism 128 locks and unlocks the door 306. For example, the shopper uses his mobile device 104 to unlock a door 306. The shopper then pockets his mobile device 104. The shopper removes an item 116 from a display 112. The shopper scans the item 116 using a scanner 132 integrated with the processing unit 106. A screen on the display 112 shows the shopper what items 116 are in the second basket (B2; the first digital basket). The screen is a digital and/or electronic display. The first digital basket is also transmitted to the mobile device 104. The shopper has the option to read the screen on the display 112 and/or on the mobile device 104. The camera 120 counts items 116 removed and updates the second digital basket. In some embodiments, the second digital basket is reflected in the screen on the display 112 and/or on the mobile device 104. In some embodiments, the camera 120 also determines what the item 116 removed is, in addition to counting the number of items 116 removed. In some embodiments, the display 112 in FIG. 5 is a mechanized store.

Figure 6:
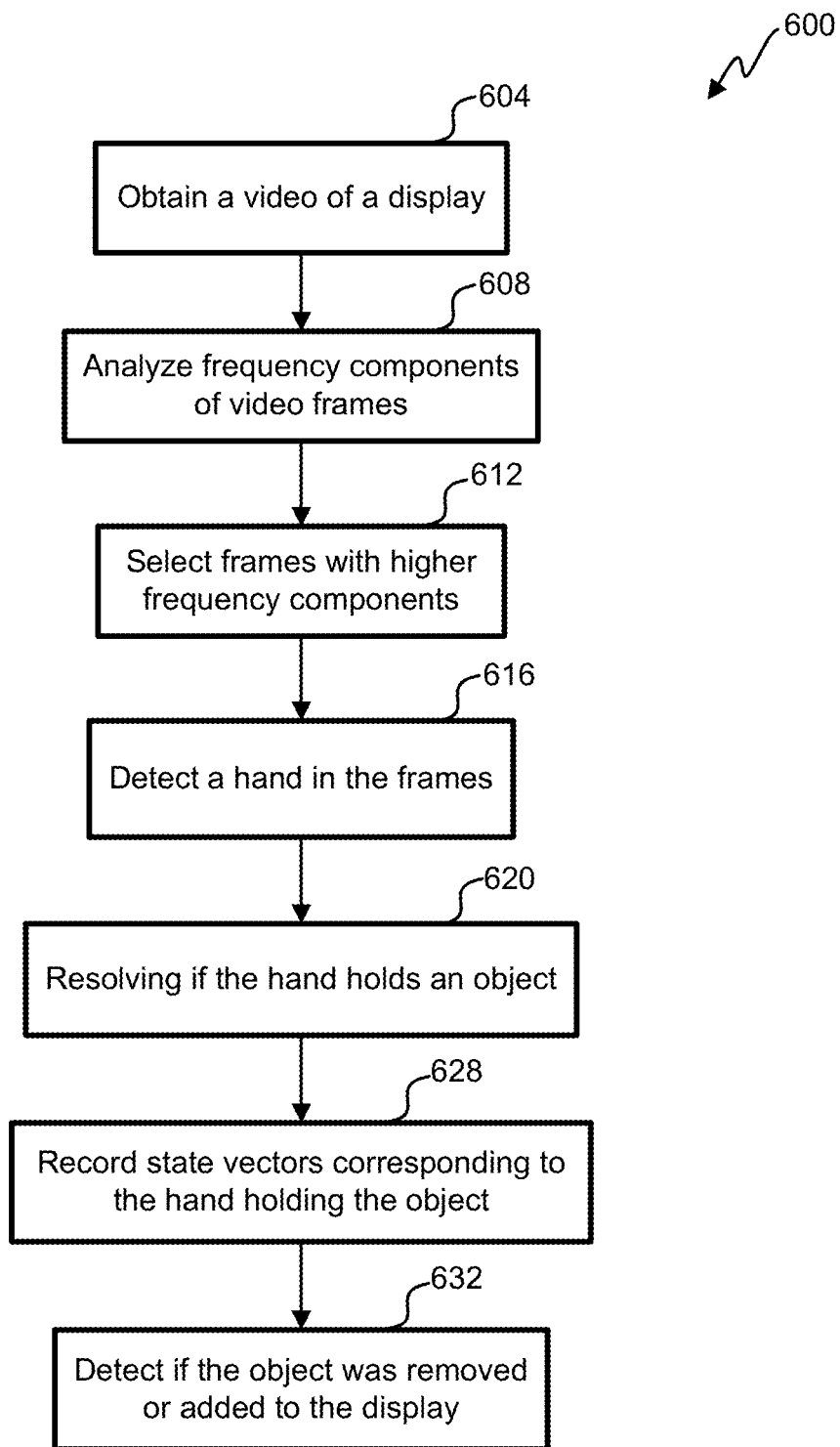
FIG. 6 illustrates a flowchart of an embodiment of a process for determining items removed from a display.

FIG. 6 illustrates a flowchart of an embodiment of a process 600 for determining items removed from a display. In some embodiments, N3 is calculated based on determining items removed from the display. Process 600 begins in step 604, with obtaining a video of a display. A camera (e.g., a video camera) is mounted in the store. The camera, which is directed at the display so that the display is in a field of view of the camera, creates a video of the display. In some embodiments, two or more cameras are used to create video of one or more displays. In some embodiments, the video is recorded. In some embodiments, the video is streamed. In some embodiments, a processor at the structure analyzes the video. In some embodiments video is saved and/or streamed to a remote location from the structure for current and/or later viewing and/or analysis.

In step 608, frequency components of frames of the video are analyzed. In some embodiments, a certain number of frames are grouped together to be analyzed. For example, 15, 30, 60, or 90 frames are analyzed together. Each frame is given a score corresponding to how high or low the frequency components are of the frame.

In step 612, a plurality of frames with higher frequency components are selected. Higher frequency components generally correspond to sharper images. Thus, frames with lower frequency components are more likely to have blurred images.

In step 616, a hand is detected in the plurality of frames of the video. In some embodiments, a hand is detected by analyzing pixels that change from frame to frame more than other pixels. For example, a background is subtracted based on a baseline image or images, generating a foreground. Pixels in the foreground change. Yet pixels used in imaging a person's torso will likely change more slowly than a person's hand as the person's hand reaches for an item. Thus, the pixels in the foreground that have a greater amount of change than other pixels in the foreground are used to determine if a hand is present. Artificial intelligence is used to identify if a hand is present in a frame.

In step 620, a processor resolves if the hand is holding an object. In some embodiments, artificial intelligence is used to determine if the hand is holding an object. In some embodiments, the artificial intelligence doesn't determine what the object is, but simply determines that the hand is holding an object. In some embodiments, the artificial intelligence determines what the object is.

In step 628 state vectors are recorded corresponding to the plurality of frames. The state vectors are based on resolving if the hand holds an object. In some embodiments, two hands are tracked. In some embodiments, a state vector includes one or more of: hand1_presence, hand1_location, hand1_product_present, hand1_productidentifier, hand2_presence, hand2_location, hand2_product_present, and hand2_productidentifier.

In step 632, the object is detected as being removed or added to the display based on the state vectors and a time sequence of the plurality of frames.

In some embodiments, in the store, overhead-mounted cameras stream video as soon as the shopping session begins (e.g., the shopper enters the store and/or opens the door). In this example, video images are transmitted wirelessly to another location where they are analyzed on a server. The system uses efficient compression of the video sequence in order to not overload the wireless channel. In some embodiments, the complete video sequences of the shopping event are transmitted and stored for potential later review in a case where suspicious behavior is detected.

The image processing system uses one or more of the following:
1. Activities relating to picking of product involve the shopper's hands.
2. Moving objects and/or body parts are of interest. In some embodiments, moving objects and/or body parts are the only aspects of images that are of interest.
3. In embodiments that allow only one person in the store and/or space, a maximum number of hands to be tracked is two.
4. Since only one person is allowed in the store, in some embodiments the system does not associate hands with a particular shopper. Rather, the association is already complete by identifying the shopper at the door.

In some embodiments, an algorithm breaks down in a number of steps:
1. Pick one image frame from the video sequence.
2. Determine if the image frame is usable by checking if the image is clear enough for the algorithm to be successful. This is accomplished by checking on the high frequency content on the image frame and comparing it to other similar images.

3. Detect the "moving" objects in the image frame by comparing individual pixels to previous image frames of the same scene.
4. Detect if there are one or more hands among the moving objects in the frame.
5. For each detected hand, determine if the hand holds an object (product) and/or how many.
6. For each detected hand, determine the location of the hand relative to the retail display shelf.
7. For each detected product, optionally identify the product, if possible.
8. Record the state vector P_i={hand1_presence, hand1_location, hand1_product_present, hand1_productidentifier, hand2_presence, hand2_location, hand2_product_present, hand2_productidentifier}
9. Go back to step #1 and repeat for the next frame.

In some embodiments, steps 2, 3, 4 and 5 are implemented using neural network models that are trained on previously recorded video sequences of similar shopping scenes. Training sequences are being obtained using one or more methods:
1. Video record acted shopping behavior and label the sequences according to labels A, B, C, D below.
2. Video record actual shoppers in real-life stores and label the behavior according to A, B, C, D below.
3. Video record actual shoppers in real-life stores and infer the overall count and product list from the shopper's bill of sale/receipt.
4. Use footage in the store. As the shopper is scanning items on her mobile phone, a labeled sequence of images of a particular event and product is created.
5. Use video footage from existing security cameras in a variety of stores and label sequences according to labels A, B, C, D below.
6. Take images of product at the checkout line in a regular store. At the time of checkout, images of a particular product are created while at the same time the product is identified typically using barcode technology.

In a second part of the processing algorithm, the system analyzes a sequence of state vectors SP in the form of SP={P_i, P_i+1, P_i+2, ..., P_i+N}, using the following steps:
1. Find the first P with a product present (P=P_k) in hand1 and/or hand2 (in the following we use the example of hand1).
2. Set SP_k={P_k−L, ..., P_k, ..., P_k+M}, where L and M are large enough so that the entire handing of the product is captured.
3. Establish the trajectory of the product by looking at the hand1_product_present field and the hand1_location fields. This results in a number of possible situations considering times k−L and k+M. Depending on which situation applies, N_k is assigned the value in the last column.

| Time k−L | Time_k−L + q | Time k + M | Event | N_k |
|---|---|---|---|---|
| Empty hand removed from shelf | Hand holding product near shelf | Hand with product away from shelf | A: Product removed from shelf | =+1 * number of products_present |
| Hand with product away from shelf | Hand holding product near shelf | Empty hand removed from shelf | B: Product replaced on shelf | =−1 * number of products_present |
| Hand with product away from shelf | Hand holding product near shelf | Hand with product removed from shelf | C: Product remains with shopper | =0 |
| Hand without product away from shelf | Hand holding product near shelf | Hand without product removed from shelf | D: Product remains on shelf | =0 |

4. Find the next P where a product is present and repeat step 1 to 3. The total count of products picked is computed as N_total=N_1+N2+N3+ ... +N_K.

Figure 7:
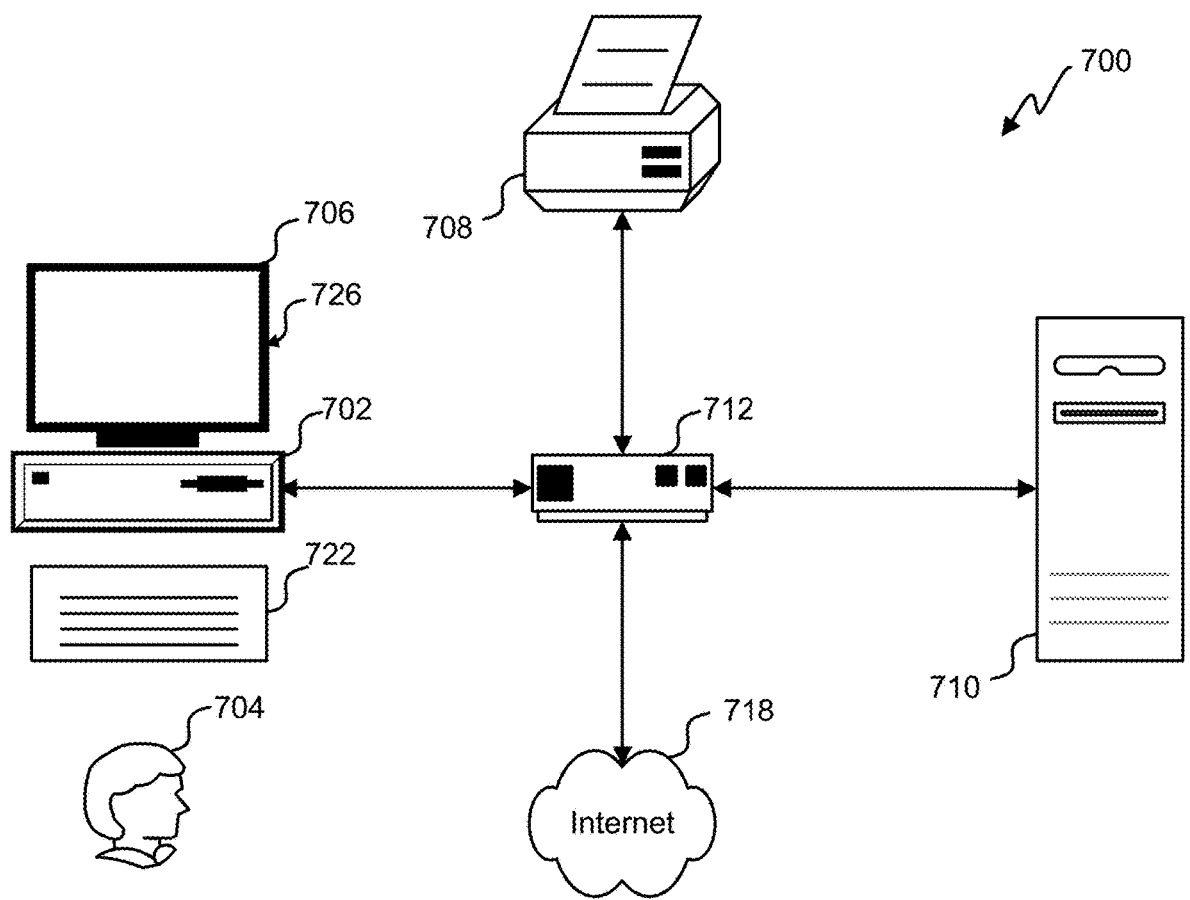
FIG. 7 depicts a block diagram of an embodiment of a computer system.

Referring next to FIG. 7, an exemplary environment with which embodiments may be implemented is shown with a computer system 700 that can be used by a designer 704 to design, for example, electronic designs. The computer system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. The monitor 706 can be a CRT, flat screen, etc.

A designer 704 can input commands into the computer 702 using various input devices, such as a mouse, keyboard 722, track ball, touch screen, etc. If the computer system 700 comprises a mainframe, a designer 704 can access the computer 702 using, for example, a terminal or terminal interface. Additionally, the computer system 726 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer system 726. Therefore, in this embodiment, the software can be used whether or not computer 702 is connected to network router 712. Printer 708 may be connected directly to computer 702, in which case, the computer system 726 can print whether or not it is connected to network router 712.

Figure 8:
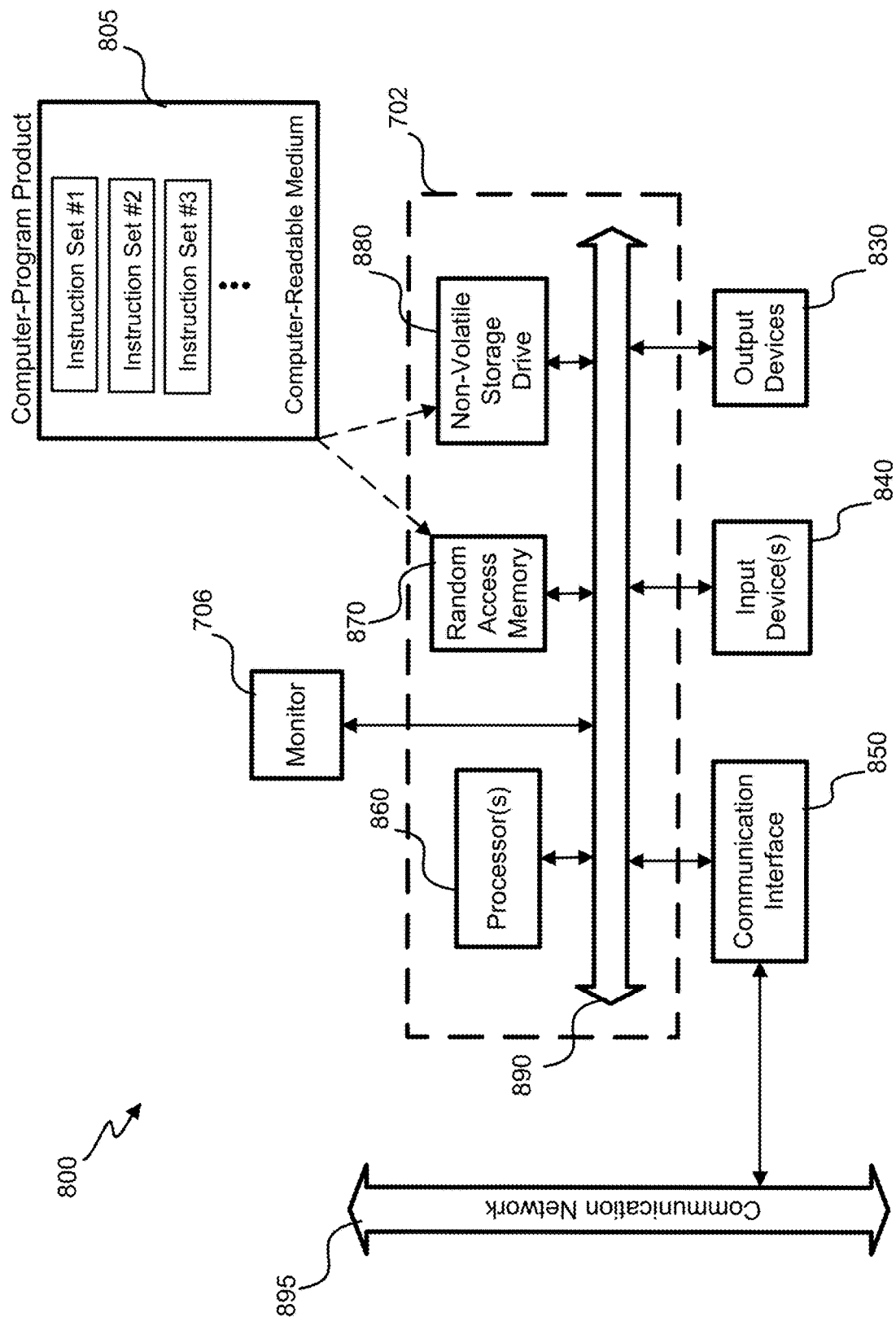
FIG. 8 depicts a block diagram of an embodiment of a special-purpose computer system.

With reference to FIG. 8, an embodiment of a special-purpose computer system 800 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general-purpose computer system 726, it is transformed into the special-purpose computer system 800.

Special-purpose computer system 800 comprises a computer 702, a monitor 706 coupled to computer 702, one or more additional user output devices 830 (optional) coupled to computer 702, one or more user input devices 840 (e.g., keyboard, mouse, track ball, touch screen) coupled to computer 702, an optional communications interface 850 coupled to computer 702, a computer-program product 805 stored in a tangible computer-readable memory in computer 702. Computer-program product 805 directs system 800 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may comprise a microprocessor, such as a microprocessor from Intel® or Advanced Micro Devices, Inc.®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft Corporation, Solaris® from Sun Microsystems, LINUX, UNIX, and the like.

User input devices 840 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 840 are typically embodied as a computer mouse, a trackball, a track pad, a joystick, wireless remote, a drawing tablet, a voice command system. User input devices 840 typically allow a user to select objects, icons, text and the like that appear on the monitor 706 via a command such as a click of a button or the like. User output devices 830 include all possible types of devices and mechanisms to output information from computer 702. These may include a display (e.g., monitor 706), printers, non-visual displays such as audio output devices, etc.

Communications interface 850 provides an interface to other communication networks and devices and may serve as an interface to receive data from and transmit data to other systems, WANs and/or the Internet 718. Embodiments of communications interface 850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments, as described above.

Software instruction sets that provide the functionality of some embodiments may be stored in RAM 870 and non-volatile storage drive 880. These instruction sets or code may be executed by the processor(s) 860. RAM 870 and non-volatile storage drive 880 may also provide a repository to store data and data structures used in accordance with some embodiments. RAM 870 and non-volatile storage drive 880 may include a number of memories including a main random access memory (RAM) to store of instructions and data during program execution and a read-only memory (ROM) in which fixed instructions are stored. RAM 870 and non-volatile storage drive 880 may include a file storage subsystem providing persistent (non-volatile) storage of program and/or data files. RAM 870 and non-volatile storage drive 880 may also include removable storage systems, such as removable flash memory.

Bus subsystem 890 provides a mechanism to allow the various components and subsystems of computer 702 communicate with each other as intended. Although bus subsystem 890 is shown schematically as a single bus, alternative embodiments of the bus subsystem may utilize multiple busses or communication paths within the computer 702.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

A number of variations and modifications of the disclosed embodiment(s) can also be used. For example, the mobile device 104 can be used in lieu of or in addition to the scanner 132. In some embodiments, the area enclosed by the structure allows a person's entire body to enter the area (e.g., FIG. 3); in some embodiments, the area enclosed by the structure does not allow a person's entire body to enter the area (e.g., FIG. 5). The result in the description of FIG. 2 can be transmitted for credit reporting. If the result in the description of FIG. 2 is non-zero and the item missing from the scanned items is under a threshold value (e.g., less than $5, $2, $1, or $0.50), then a note is made to the record and the user is able to check out without delay. But if the user has multiple instances of a non-zero report, then the user is prohibited from using the service. In some embodiments, a credit card and/or other type of payment is linked to an account of the user and is charged after a transaction. In some embodiments, the cameras 120 don't track a user in the area (e.g., to conserve bandwidth and processing speed). In some embodiments, the cameras 120 do track the user in the area. In some embodiments, the registry is purged after a user completes a shopping experience to save memory and/or enable the processing unit 106 to run more efficiently. In some embodiments, video data in local storage is transferred to a remote storage, and the video data in the local storage is purged (e.g., weekly, daily, every 12 hours, and/or after a shopping transaction is completed by a user) so that the local storage and/or the processing unit 106 can run more efficiently. Though this description provides examples using a door for access control, other access controls could be used. For example, physical access can be provided by one or more of the following: cabinet door, turnstile, store door, sliding door, swing door, fridge door, lock, bike lock, and/or optical gate.

While the principles of the disclosure have been described above in connection with specific apparatuses and methods, it is to be clearly understood that this description is made only by way of example and not as limitation on the scope of the disclosure.

FIG. 9 depicts exemplary merchant database 902 and user database 904. Merchant database 902 (e.g. one or more parts of store database 136 and/or one or more parts of product database 144) and user database 904 (e.g. one or more parts of consumer database 140) may store information (e.g. data points) associated with a user session. A user session may be established once a user enters into a specific area (e.g., store 102). In one embodiment, a user may be authenticated prior to initiating a user session. For example, a user may be authenticated prior to being allowed entry into an area. Data may be gathered during a user session such as data from one or more sensors (e.g., one or more cameras 120) that is associated with one or more items (e.g., item 116) within the area. As shown in FIG. 9, data within merchant database 902 may include a user session identifier (ID), a user ID, encrypted automatic identification and data capture (AIDC) information, encrypted sensor data, entry time associated with a user session, exit time associated with the user session, a session location, one or more results, and a ledger pointer.

A user session ID may include an identifier associated with a user session. The user session identifier may be a numeric value, alphanumeric value, or any other value that may uniquely identify a user session within a database. Each separate time a user enters an area a new user session ID may be generated. A user ID may include an identifier associated with the user. The user ID may be a numeric value, alphanumeric value, or any other value that may uniquely identify a user within a database.

Encrypted AIDC information may include any information that identifies an item within the area that is encrypted by a key. Information that identifies an item may be stored in a machine readable format such as bar code, RFID, magnetic strip, quick response (QR) code, and the like. The machine readable format may be affixed to an item itself. For example, the machine readable format may be presented as a label affixed to an item. Information that identifies an item may be a serial number associated with an item. The key used to encrypt the AIDC may be a merchant key. The merchant key may be an encryption key associated with a merchant. A merchant may be a provider of one or more items within the area. In one embodiment, a merchant may be a provider of the area itself. The merchant key be a symmetric key or a public key associated with the merchant. In circumstances when the merchant key is a public key the encrypted AIDC information may be encrypted with the merchant public key and the merchant may hold or control access to (e.g., via a password, biometric information of the merchant, and the like) the private key associated with the merchant public key.

Encrypted sensor data may include sensor data that identifies one or more actions taken during a user session. User action may be a user removing a specific item from the area, removing a specific item from a shelf in the area, displacing a specific item from a first location to a second location, entering the area, leaving the area, and the like. Sensor data may be captured by various sensors or other devices. For example, sensor data may be captured by one or more cameras within the area. In one embodiment, sensor data may include personally identifiable information of a user. Personally identifiable information may include, but not be limited to, the face of the user, a visually distinguishing characteristic of the user, biometric information of the user, a passport number associated with the user, a driver's license number associated with the user, handwriting associated with the user, a geographic location associated with the user, a race or nationality associated with the user, or any other information that may be utilized to personally identify a user. In one embodiment, within merchant database 902, AIDC and sensor data are both encrypted with the merchant key.

In one embodiment, encrypted sensor data within merchant database 902 may not include personally identifiable information associated with a user. Instead, the personally identifiable information may be stored as encrypted sensor data within user database 904. In such an instance, the encrypted sensor data within merchant database 902 may include sensor data with redacted personally identifiable information (e.g., video of a user within the area with his face blurred). The encrypted sensor data within user database 904 may be encrypted by a user key associated with a user. The user key may be a symmetric key or a public key associated with the user. In circumstances when the user key is a public key the encrypted sensor data within user database 904 may be encrypted with the user public key and the user may hold or control access to (e.g., via a password, biometric information of the user, and the like) the private key associated with the user public key. By providing two different types of encrypted sensor data a user may control access their personally identifiable information in compliance with various laws and regulations such as General Data Protection Regulation (GDPR).

An entry time may include a timestamp associated with a time when a user enters the area. Similarly, an exit time may include a timestamp associated with a time when a user exits the area. Together the entry time and exit time may indicate a user session duration.

A session location may include a unique indication of the location of the area. In one embodiment, a user may have access to a plurality of different areas. In such an instance, the session location indicates the particular area associated with a user session.

A result may include transaction information associated with a user session. A result may include the identification of one or more items removed from the area during a user session. For example, a result may indicate a number of items indicated as being removed from the area according to sensor data, a number of items indicated as being removed from the area according to AIDC information, a discrepancy between the number of items indicated as being removed from the area according to AIDC information and the number of items indicated as being removed from the area according to sensor data. A result may further indicate specific items that were displaced, removed, or relocated during a user session (e.g., moved from a first shelf to a second shelf or moved from a first self to a bag). In one embodiment, a result may be later verified or validated based on one or more data points within merchant database 902, user database 904, and/or a decentralized database.

A ledger pointer may include a pointer or link to a block or segment within a distributed ledger (e.g., decentralized database) associated with a user session. The distributed ledger may contain unique identifiers associated with one or more aspects of a user session. In one embodiment, a unique identifier may be generated using data associated with a user session (e.g., encrypted sensor data from merchant database 902 or encrypted sensor data from user database 904) as an input into a cryptographic function (e.g., a hash function). Because this unique identifier is stored in a separate location the ledger pointer identifies and/or links to the storage location of the unique identifier.

Some data associated with a user session may be different between merchant database 902 and user database 904. In one embodiment, whenever a user session is initiated user session information is stored within two distinct centralized databases (i.e. merchant database 902 and user database 904). Some of the information in both databases may be the same. For example, as indicated in FIG. 9, the user session with the user session ID of abc123 has similar values for user session ID, user ID, entry time, exit time, session location, result, and ledger block pointer within merchant database 902 and user database 904. These data points may be synchronized between the merchant database 902 and user database 904 so that these values are the same. However, some of the information such as the encrypted sensor data may be different between merchant database 902 and user database 904 for a user session. For example, as indicated in FIG. 9, the user session with the user session ID of abc123 has different values for encrypted sensor data within merchant database 902 and user database 904. In one embodiment, the encrypted sensor data values may be different because two different keys (e.g., a user key and a merchant key) were utilized to encrypt the sensor data. In one embodiment, the encrypted sensor data values may be different because the encrypted sensor data within merchant database 902 is stripped of personally identifiable information, whereas the encrypted sensor data within user database 904 contains the personally identifiable information. In one embodiment, as depicted in FIG. 9, user database 904 may omit encrypted AIDC information (or AIDC information) as this information may be more relevant to a merchant than a user. Although merchant database 902 is shown with only two encrypted parts (e.g., encrypted AIDC information and encrypted sensor data) one or more other data points associated with a user session may be encrypted by a merchant key and stored within merchant database 902. For example, the result within merchant database 902 may be encrypted by the merchant key. Similarly, although user database 904 is shown with only one encrypted part (e.g., encrypted sensor data) one or more other data points associated with a user session may be encrypted by a user key and stored within user database 904. For example, the ledger pointer within user database 904 may be encrypted by the user public key. By utilizing two distinct data stores (e.g., merchant database 902 and user database 904) there may be two records of a user session within the area such that if one is corrupted the other may be relied upon (i.e., data redundancy). In addition, by utilizing two distinct data stores a user may control access to one or more aspects of his data associated with a user session. For example, encrypted sensor data with personally identifiable information may only be stored within user database 904 and encrypted with a user key. Thus, preventing anyone besides the user from accessing personally identifiable information associated with a user session. In one embodiment, each row of user database 904 is stored not within a single database but instead on a user's device such that a user's own session information may be locally stored on a device local to a user (e.g., a mobile phone, tablet, personal computer).

In one embodiment, merchant database 902 and/or user database 904 may contain voluminous and large amounts of data (e.g., encrypted AIDC and encrypted sensor data) associated with a plurality of user sessions. Such data may not be practically stored within a distributed ledger. However, the ledger pointer may point to a particular block or segment within a distributed ledger that may contain information that may be utilized to verify or validate a result indicated in merchant database 902 and user database 904. For example, the distributed ledger may contain a cryptographically immutable unique identifier that represents an aspect (e.g., encrypted AIDC data, encrypted sensor data, and the like) of a user session. The unique identifier may be then used to verify a result by indicating if one or more aspects of the user session has been maliciously altered by any party. Because, in part, user session data is stored in two separate records either party may maliciously attempt to alter records that they may have access to in order to invalidate or alter a result. By utilizing a distributed ledger in addition to merchant database 902 and user database 904 malicious actions by parties may be detected and results may be validated or verified.

For example, suppose the result in merchant database 902 and user database 904 indicate that a user removed a specific item from a specific area during a user session. Data points associated with that session may be duplicated and stored within merchant database 902 and user database 904 (although some data points may be different as described above). In one embodiment, a merchant may attempt to malicious modify the result associated with the user session. Thus, the result in user database 904 and result in merchant database 902 may be different. To combat this issue, a hash of the result (when generated) may be generated to form a unique identifier. Any suitable hash algorithm may be utilized such as SHA-256. The unique identifier may be then written to a block or segment with a distributed ledger. This block may be referenced by a ledger pointer associated with the user session. When the merchant attempts to indicate to the user the malicious result, both the user and the merchant may, via the ledger pointer, acquire the unique identifier that indicates a hash of the result. Because the merchant has maliciously altered the result when the merchant hashes the result from merchant database 902 it will not match the unique identifier that is indicated by the ledger pointer. However, the result in user database 904 when hashed may match the unique identifier that is indicated by the ledger pointer because the result in the user database 904 has not been maliciously altered. As a result, utilizing a distributed ledger, voluminous data points stored within different databases may be verified or validated without having to store voluminous data points within the distributed ledger itself.

Figure 10:
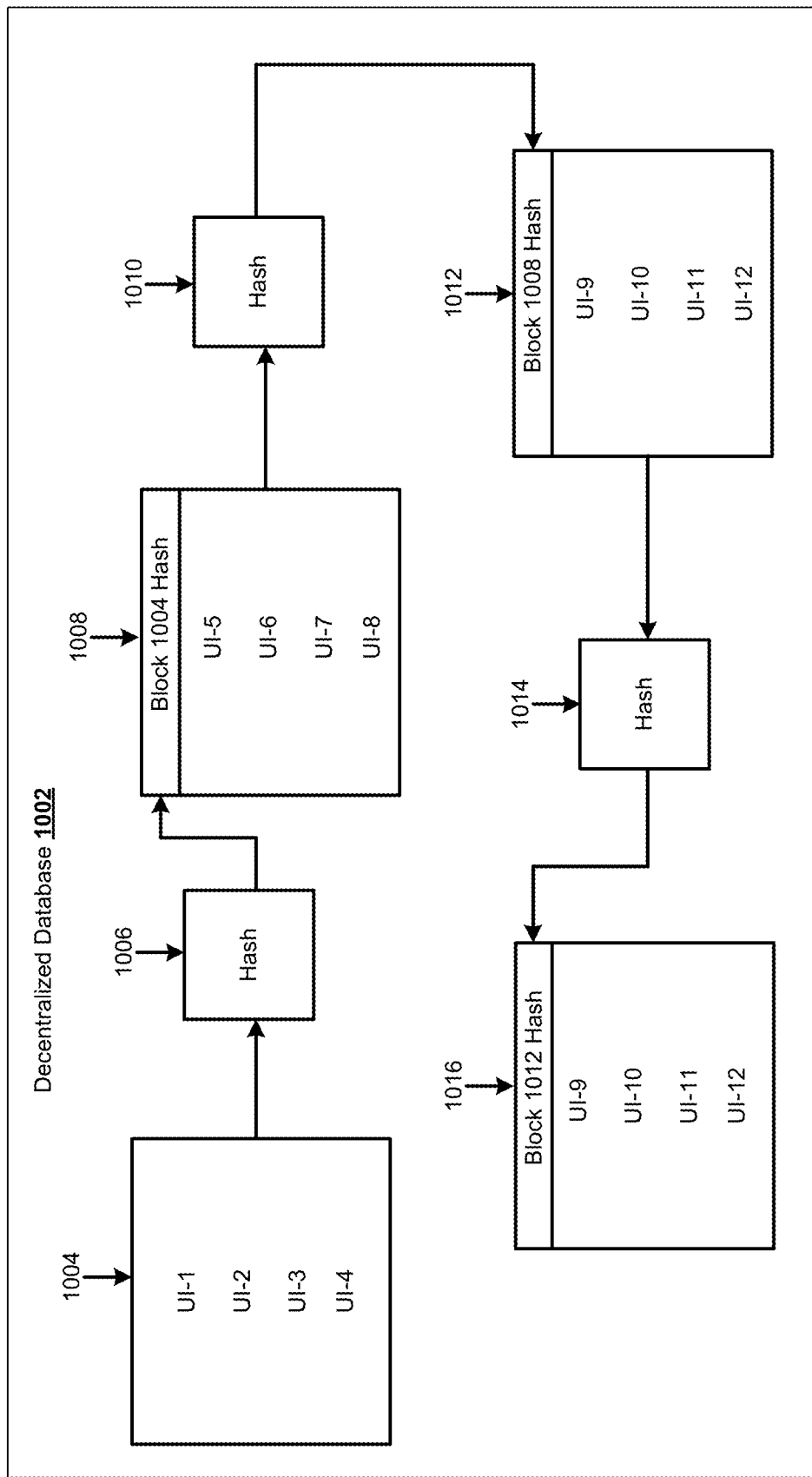
FIG. 10 depicts an exemplary decentralized database according to one or more embodiments.

FIG. 10 illustrates decentralized database 1002 which is an exemplary decentralized database (i.e. distributed ledger) in accordance with one or more embodiments. Decentralized database 1002 may be stored in a plurality of computing devices. Each computing device may contain a copy of decentralized database 1002. Decentralized database 1002 may be a blockchain comprising a plurality of cryptographically linked blocks 1004, 1008, 1012, and 1016. Blocks 1004, 1008, 1012, and 1016 may be cryptographically linked by hash functions 1006, 1010, and 1014. Each of blocks 1004, 1008, 1012, and 1016 may contain one or more unique identifiers and each block may be considered a segment of decentralized database 1002. For example, block 1004 comprises unique identifier 1, unique identifier 2, unique identifier 3, and unique identifier 4. Each unique identifier may be a cryptographic representation of one or more data points associated with a user session in a specific area. For example, a unique identifier within blocks 1004, 1008, 1012, and 1016 may be generated utilizing a hash function (e.g., SHA-256) and one or more data points within merchant database 902 and/or user database 904 as depicted in FIG. 9. In such an example, a unique identifier may be generated based on encrypted sensor data. Furthermore, a unique identifier may be generated to provide an immutable description of an item within an area. For example, a unique identifier may a cryptographically generated unique identifier based on an image of one or more items, AIDC data, numerical item identifiers, location information associated with an item or a user session. In such an example, a unique identifier may established evidence that an item or a user was in a certain a certain state at a certain time. In such an example, an image or identifier of an item and a timestamp may be used as input into a cryptographic function generate a unique identifier to indicate a state of an item at a given time. If later the item is broken or missing then the unique identifier may be a cryptographically immutable reference that the item was not previously broken or missing at an early time.

Block 1004 may be a genesis block within decentralized database 1002. A genesis is the first block within a blockchain. Block 1004 may contain a plurality of unique identifiers from a single user session or from multiple user sessions. In one embodiment, each block within decentralized database 1002 may contain only unique identifiers associated with a single user session. In such an embodiment, block 1004 may contain unique identifiers for encrypted sensor data, session location information, user ID, entry and exit times, and the like for a single user session. In one embodiment, each block within decentralized database 1002 may contain unique identifiers associated with multiple user sessions.

Block 1004 may be an input into hash 1006 and the resulting hash (i.e. block 1004 hash) may be implemented (e.g., within the header or within the body) into block 1008. Block 1008 may comprise unique identifiers 5-10 in addition to the hash of block 1004. Block 1008 may then be input into hash 1010 and the resulting hash (i.e. block 1008 hash) may be implemented into block 1012. This cryptographically linking process may continue for blocks 1012 and 1016. By including a hash of the previous block into a current block, the previous block may become cryptographically immutable. For example, the hash of block 1004 may be represented in block 1016 because block 1016 includes a hash of block 1012, which includes a hash of block 1008, which includes a hash of block 1004. As a result, if any information in block 1004 is modified, that would in turn modify every subsequent block (e.g., block 1008, block 1012, and block 1016). Such a change would modify the blockchain within a noticeable way. Thus, making any changes in previous blocks easily detectable and ensuring previous blocks contain unmodified data points. As can be seen from the previous description, multiple databases (e.g., user database 904 and merchant database 902) may be utilized to store a plurality of files that may be large (e.g., 5 MB, 10 MB, 100 MB, 1 GB, and the like) while decentralized database 1002 may be utilized to verify one or more data points stored within the multiple databases.

Figure 14:
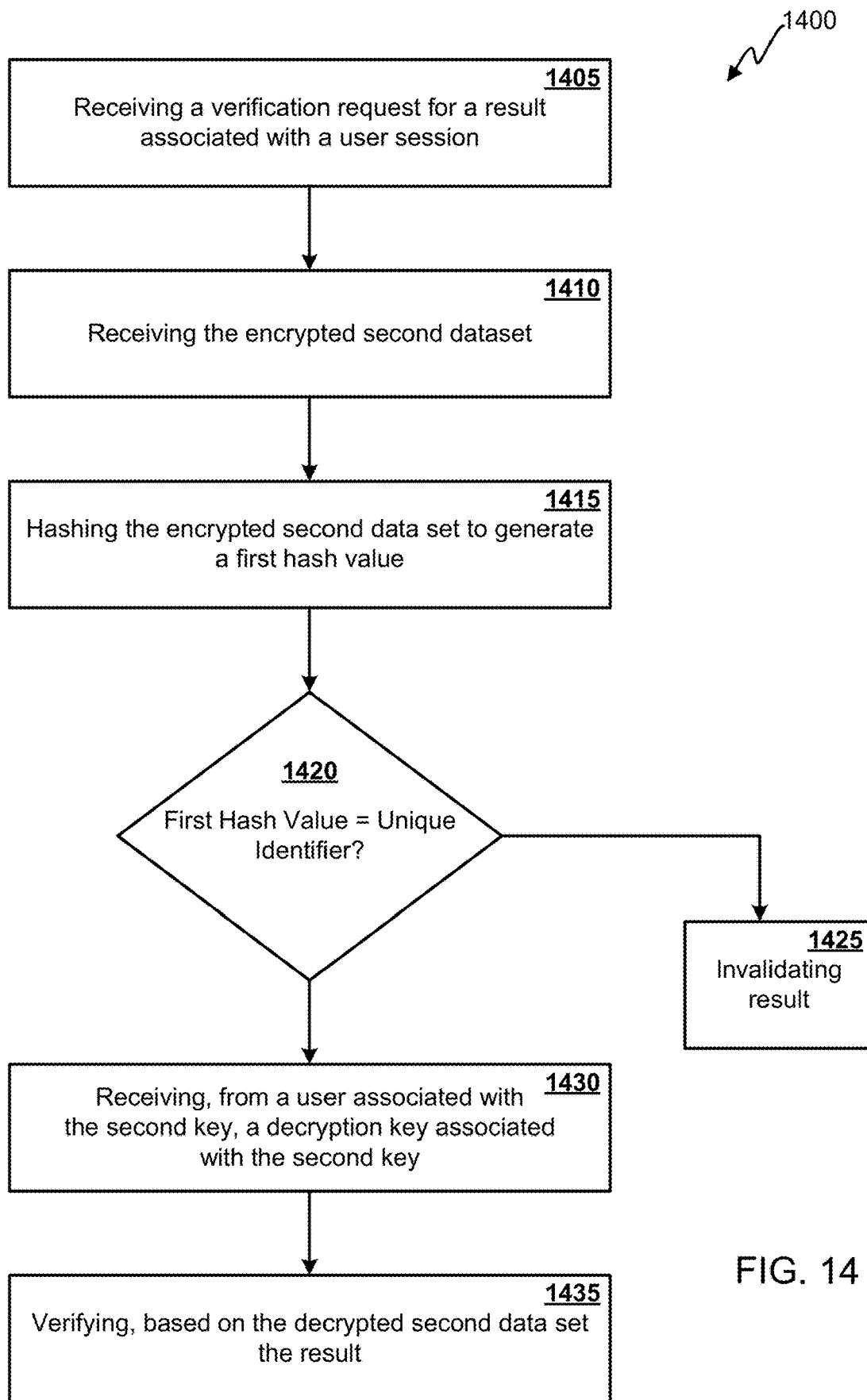
FIG. 14 illustrates an exemplary process according to one or more embodiments.

In one embodiment, a different distributed database associated with digital assets (e.g., cryptocurrencies) may be utilized in conjunction with decentralized database 1002. For example, the different distributed database may be a distributed ledger that stores indications of transactions associated with a digital asset. This digital asset may be utilized in various aspects of embodiments. For example, a digital asset may be utilized for one or more of the following: as payment for one or more items within an area, and as payment to a reviewer (or an oracle reviewing) of a result (e.g. result stored within a merchant database or user database). In instances where the digital asset is used for payment of one or more items, upon initializing a user session, a user's digital wallet (which identifies a quantity of the digital asset) may be accessed and a temporary hold may be placed on a predetermined quantity of a user's digital assets to act as collateral. Such collateral may ensure that a user pays for one or more removed (e.g., purchased) items. In instances where the digital asset is used as payment to a reviewer or oracle, a reviewer or an oracle may be provided that may verify a result within a merchant database and/or user database based on information within information within the merchant database, the user database, and/or a decentralized database. An oracle or reviewer may perform the process as shown in FIG. 14 block 1435. For example, an oracle may review decrypted sensor data to determine how many items a user removed during a user session and may be compensated for the review.

In addition to digital assets, the different distributed database may also support smart contracts. A smart contract may be code stored within the different distributed database that is cryptographically immutable and automatically executes if certain coded conditions are met. A smart contract may be utilized within various embodiments. For example, when a user uses a digital asset as payment, a smart contract may receive, as an input, the payment from the user for an item and may output, after a certain period of time (e.g., 30 days), the payment back to the user (e.g., when the item is returned) or to a merchant associated with the item (e.g., when the item is not returned). Such an embodiment may allow dispute resolution where there is no central trusted third party to process a payment (e.g., bank). In another example, when there is a temporary hold placed on a predetermined quantity of a user's digital assets as collateral, a smart contract may facilitate the temporary hold. In such an example, the smart contract may receive, as inputs, one or more of: an identity of the user (e.g., user ID), purchase history of the user, rating of a user, type of items offered in a specific area associated with a user, the average transaction amount associated with a specific area, the amount of inventory at a specific location and the like, and output, based on code comprising the smart contract, the quantity of a user's digital assets that should be taken as collateral.

Figure 11:
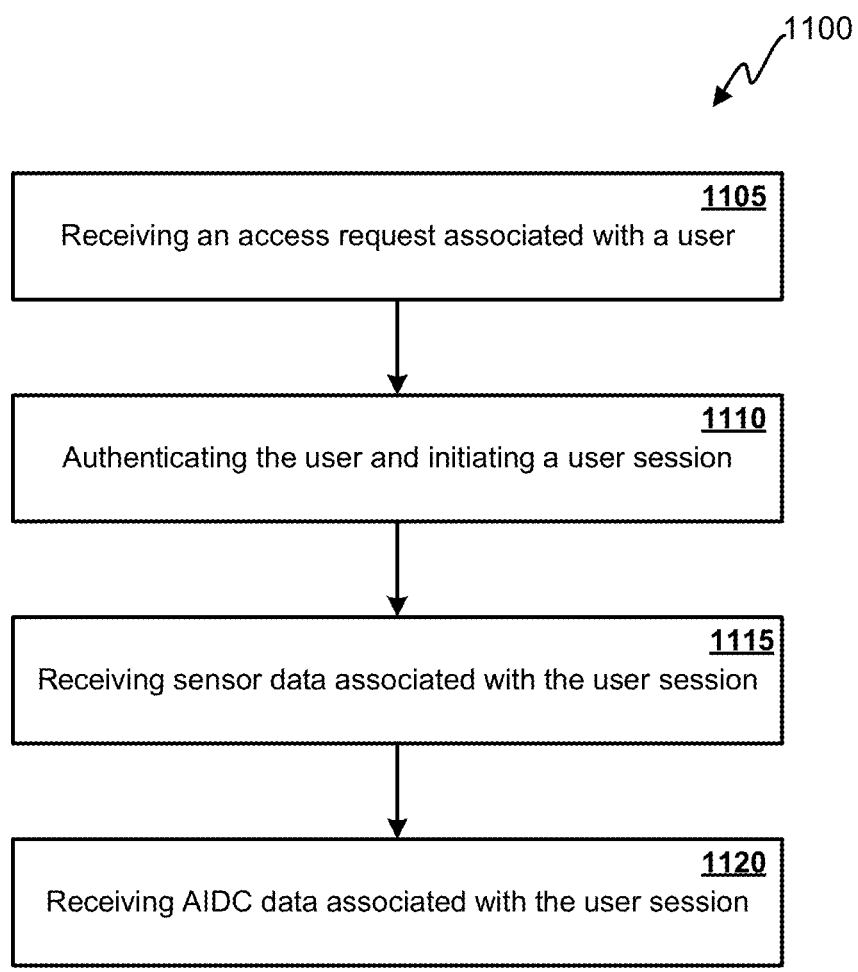
FIG. 11 illustrates an exemplary process according to one or more embodiments.

FIG. 11 illustrates process 1100 that may be an exemplary process for initiating a user session and recording data associated with a user session. Process 1100 may be implemented by one or more systems (e.g., processing unit 106 as referend by FIG. 1). At 1105, a system receives an access request associated with a user. A user, if authenticated, may gain access to a specific area (e.g., enclosure 108 as referenced by FIG. 1). The area may be an enclosed area. The access request may include some type of user authentication information such as user biometric information, a password, a user identifier, a telephone number, and/or a combination of any of the previously listed elements.

At 1110, the system authenticates the user associated with the access request and initiates a user session. The system may authenticate the user by comparing the authentication information received at 1105 with previously stored authentication information. For example, the system may determine a password in the received access request matches a previously stored password. After the user is authenticated, a specific area may be physically unlocked or made available to the user. For example, the system may send a signal to a locking mechanism at the area to unlock the locking mechanism in order to allow the user to enter the area. In one embodiment, the area may have a motion sensor that a user may activate by walking across. Once a signal from the motion sensor is received by the system a user session may be initiated. To initiate a user session, the system may allocate storage within one or more databases (e.g., a user database and/or merchant database) for data points associated with the user session. In one embodiment, the allocated storage may be identified by a unique user session identifier.

At 1115, the system receives sensor data associated with the user session. Sensor data may include data that identifies one or more user actions taken during a user session. In one embodiment, sensor data may include personally identifiable information of a user. In one embodiment, sensors that acquire sensor data may be affixed to the specific area associated with a user session. The system may, upon receiving sensor data, identify personally identifiable information within the sensor data. Personally identifiable information may be identified based on various techniques such as facial recognition, optical character recognition (to determine if displayed documents contain sensitive information such as passport numbers, credit card numbers etc.), iris scans, finger print readers, hand scanners, and the like. The received sensor data may then be stored to an allocated portion of one or more databases. In one example, the sensor data may be received by the system and the system may determine personally identifiable information within the sensor data. The system may then produce two versions of the sensor data, a merchant version containing no personally identifiable information, and a user version containing the personally identifiable information. The system may then encrypt and store the merchant version of the sensor data within a merchant database and encrypt and store the user version of the sensor data within a user database. Prior to or after storing the received sensor data, the system may identify a result based on the received sensor data and store the result within one or more databases. Stored sensor data and results associated with stored sensor data may be associated with or linked with the user session identifier associated with the user session initiated at 1110. The one or more databases may be stored in the same physical location or in different physical locations. The one or more databases may be implemented on the same computing platform or in a different computing platform. For example, a first database may be implemented as SQL database and a second database may be implemented as a DB2 database.

At 1120, the system receives AIDC data (information) associated with the user session. In one embodiment, AIDC data may include any information that identifies an item within the specific area associated with a user session. In one embodiment, the system receives AIDC data from one or more scanners within the area. In one embodiment, the devices which record and transmit AIDC data to the system are different from the devices that record and transmit sensor data to the system. The system may encrypt and store received AIDC database in a plurality of databases (e.g., merchant database and/or user database). Prior to or after storing received AIDC data, the system may identify a result based on the received AIDC data and store the result within one or more databases. Stored AIDC data and results associated with stored AIDC data may be associated with or linked with the user session identifier associated with the user session initiated at 1110.

Figure 12:
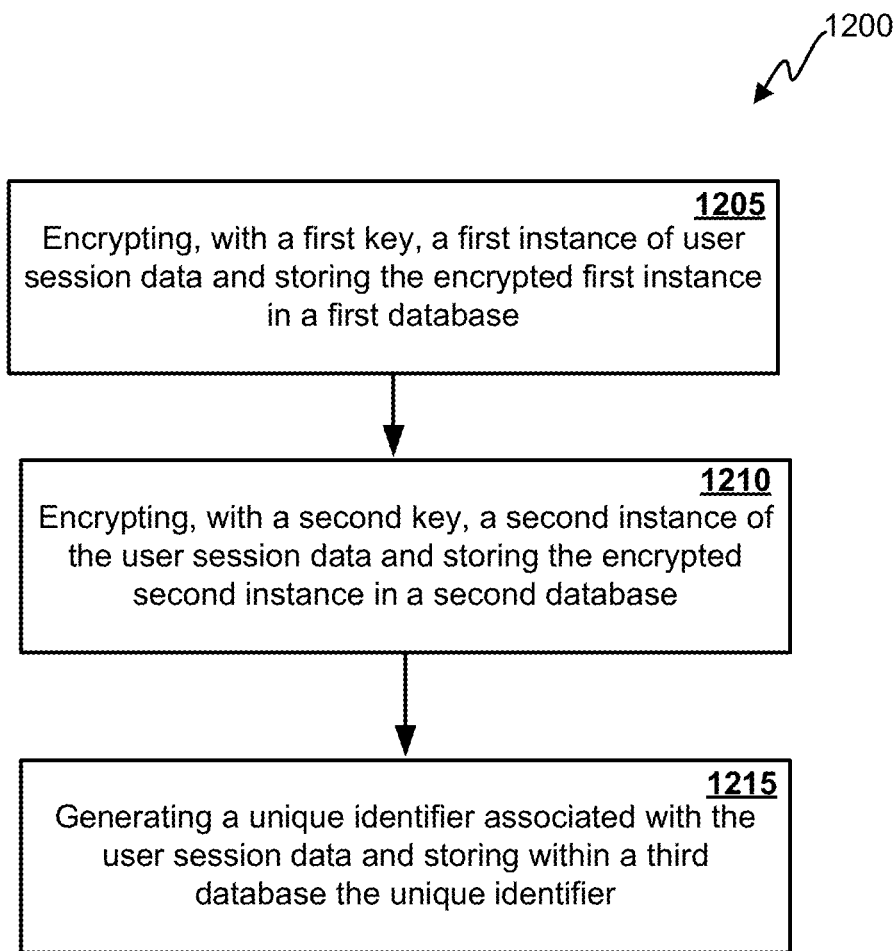
FIG. 12 illustrates an exemplary process according to one or more embodiments.

FIG. 12 illustrates process 1200 that may be a first exemplary process for establishing access rights to information associated with a user session. Process 1200 may be implemented by one or more systems (e.g., processing unit 106 as referend by FIG. 1). In one embodiment, process 1200 may be implemented after a user session has been initiated (e.g. block 110 of FIG. 11). At 1205, a system encrypts, with a first key, a first instance of user session data and store the encrypted first instance in a first database. User session data may be generated by one or more devices affixed to a specific area associated with a user session. User session data may include, but not be limited to, a user session ID, a user ID, AIDC data (information), sensor data, entry time, exit time, user session location, a result associated with the user session, and/or a ledger pointer associated with the user session. The system may receive user session data throughout an active user session within the area. The system may then store within a first database (e.g., a merchant database) received (or calculated (e.g., a result)) user session information that has been encrypted by a first key (e.g., merchant key). In one embodiment, only a portion of the received (or calculated) user session information is encrypted by the first key, which means one or more portions of user session information (e.g., entry time and exit time) may be stored in an unencrypted form within with the first database.

At 1210, the system encrypts, with a second key, a second instance of the user session data and stores the encrypted second instance in a second database. The system may duplicate the received user session data and encrypt the duplicated data with a second key and store the encrypted data in a second database. The second database may be a database associated with a user (e.g., a user database) and the second key may be a key associated with the user (e.g., user key). In one embodiment, only a portion of the received (or calculated) user session information is encrypted by the second key, which means one or more portions of user session information may be stored in an unencrypted form within the second database. In one embodiment, the second database may include encrypted information not stored in the first database. For example, when user session data includes personally identifiable information. This personally identifiable information may be removed for user session data encrypted and stored in the first database, but may be included in the user session data encrypted and stored in the second database. By creating multiple instances of user session data there may be two separate databases that store user session data, which may provide data redundancy. Furthermore, each database may have different access controls associated with them which may increase information security.

At 1215, the system generates a unique identifier associated with the user session data and stores within a third database the unique identifier. One or more aspects of received user session data may be utilized to generate a unique identifier. In one embodiment, a unique identifier may be generated using data associated with a user session (e.g., encrypted sensor data) as an input into a cryptographic function (e.g., a hash function). The unique identifier may be generated at the same time or near the same time that the user session data is received. By generating the unique identifier at a time close to when the user session data is received it may assure that the unique identifier is an accurate representation of one or more data points associated with user session data. For example, whenever the system receives sensor data from a user session the system may simultaneously or near simultaneously encrypt and store the sensor data within the first database, encrypt and store the sensor data within the second database, and generate and store within the third database the unique identifier for the sensor data. The first, second, and third databases may be distinct data stores. In one embodiment, the first and second databases may be implemented as centralized databases and the third database may be a decentralized database. In such embodiment, data within the third database may be utilized to verify data within the first and second databases.

Figure 13:
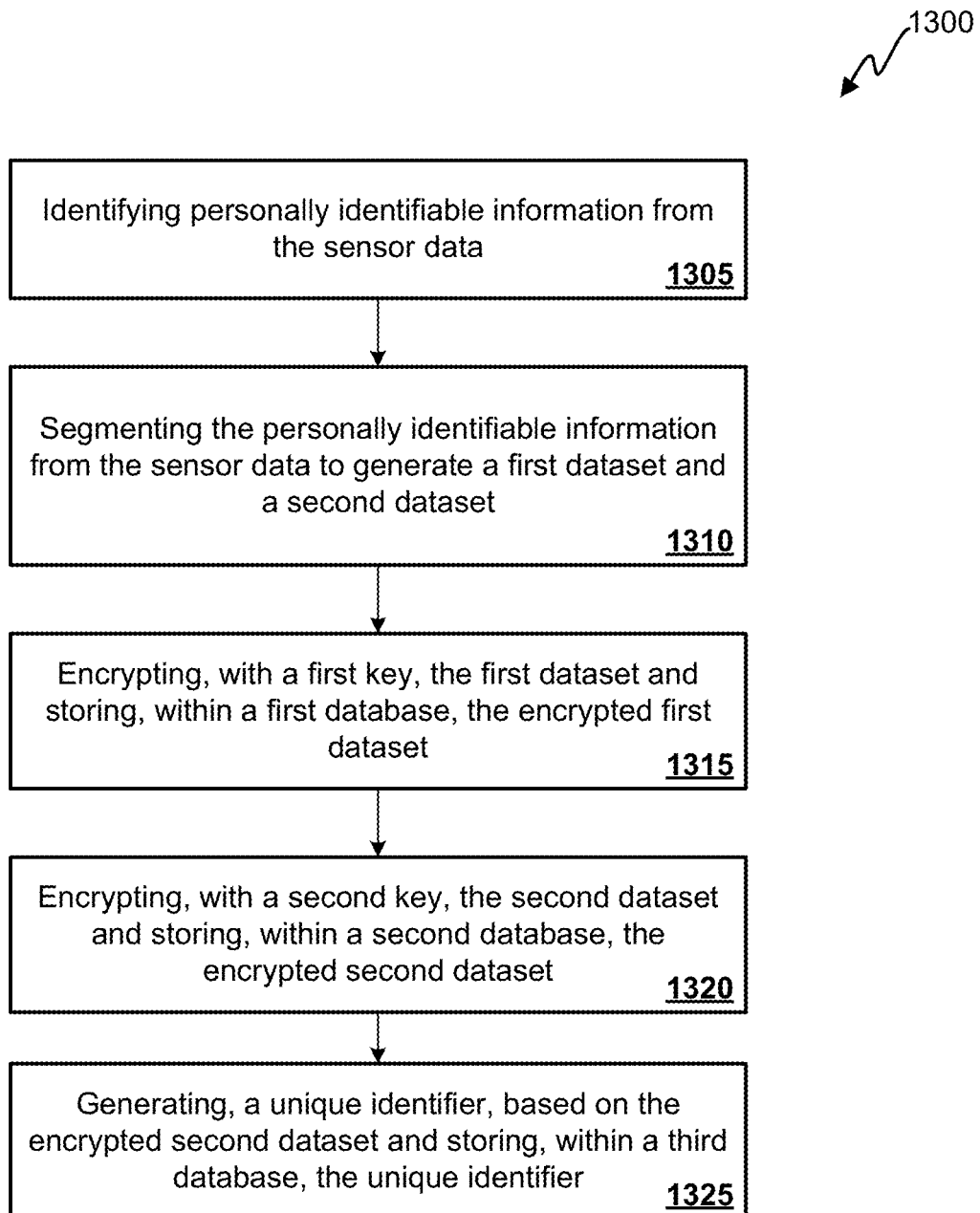
FIG. 13 illustrates an exemplary process according to one or more embodiments.

FIG. 13 illustrates process 1300 that may be a second exemplary process for establishing access rights to information associated with a user session. Process 1300 may be implemented by one or more systems (e.g., processing unit 106 as referend by FIG. 1). In one embodiment, process 1300 may be implemented after a user session has been initiated (e.g. block 110 of FIG. 11). At 1305, the system identifies personally identifiable information from received sensor data associated with a user session. The system may, upon receiving sensor data, identify personally identifiable information within the sensor data. Personally identifiable information may be identified based on various techniques such as facial recognition, optical character recognition (to determine if displayed documents contain sensitive information such as passport numbers, credit card numbers etc.) and the like.

At 1310, the system may segment the personally identifiable information from the sensor data to generate a first dataset and a second dataset. The first dataset may include sensor data that is absent of personally identifiable information. The first dataset may include sensor data with personally identifiable information removed, blurred, obfuscated, and the like. For example, sensor data, within the first dataset, may include one or more video frames of a user within a specific area associated with a user session with the user's face blurred out. The second dataset may include sensor data that includes personally identifiable information. For example, sensor data, within the second dataset, may include one or more video frames of a user within a specific area associated with a user session that shows the user's face.

At 1315, the system encrypts, with a first key, the first dataset and stores within a first database the encrypted first dataset. The first key may be associated with a merchant. The merchant may provide one or more items within a specific area associated with a user session. The merchant may control access to the merchant key. The first database may be a database associated with the merchant.

At 1320, the system encrypts, with a second key, the second dataset and stores within a second database the encrypted first dataset. The second key may be associated with a user. The user may interact with one or more items within a specific area associated with a user session. The user may control access to the user key. The second database may be a database associated with the user.

At 1325, the system generates a unique identifier based on the encrypted second dataset and stores within a third database the unique identifier. In one embodiment, the unique identifier may be generated using the encrypted second dataset as an input into a cryptographic function (e.g., a hash function). The unique identifier may be included within a block or segment within the third database. In one embodiment, the third database is implemented by a blockchain. By inputting the unique identifier into a block of a blockchain the unique identifier may be cryptographically immutable and can be later used to verify a user (or another malicious actor) has not modified the encrypted second dataset. Such verification may be important because a merchant may not have access to the second dataset because the second dataset is encrypted by a user key. Thus, a merchant may not know if a user (or another malicious actor) modifies stored sensor data with personally identifiable information.

FIG. 14 illustrates process 1400 that may be an exemplary process for verifying a result associated with a user session. Process 1400 may be implemented by one or more systems (e.g., processing unit 106 as referend by FIG. 1). Process 1400 may be a continuation of process 1300 (as depicted in FIG. 13) and may occur after process 1300 has ended. At 1405, the system receives, a verification request for a result associated with a user session. A result may include transaction information associated with a user session. A result may include the identification of one or more items removed from a particular area during a user session. The system may determine a result based on various data points associated with a user session (e.g., sensor data, AIDC information, and the like). A user or another party (e.g., a merchant) associated with a result may send to the system the verification request. The verification request may include a user session identifier to identify the session in question as well as the result identifier to identify the result in question.

At 1410, the system receives the encrypted second dataset. As detailed at 1310 of FIG. 13, the second dataset includes sensor data with personally identifiable information. The second dataset is further encrypted by a second key associated with a user. The system may, upon receiving the verification request, request the encrypted second dataset from the user or may retrieve the encrypted second dataset from a user database. Because the second dataset is encrypted with a second key and the user controls access to the second key, the system may not be able to decrypt the encrypted second key without permission from the user. However, the system may still be able to determine if any modifications were performed to the encrypted second dataset.

At 1415, the system hashes the encrypted second dataset to generate a first hash value. At 1420, the system compares the first hash value to a unique identifier associated with the user session. User session data may indicate a ledger pointer associated with a user session. The ledger pointer may point to a block within a decentralized database that contains a unique identifier. The unique identifier may have been generated by hashing a previously generated version of the encrypted second dataset. The ledger pointer may also identify the hashing algorithm utilized to create the unique identifier. The system may use this same hashing algorithm to generate the first hash value at 1415. By generating the first hash value and comparing the first hash value to a unique identifier it can be determined if the received encrypted second dataset (at 1410) has been altered. If the first hash value does not equal the unique identifier as stored within the decentralized database then process 1400 moves to 1425 and the result associated with the verification request is invalidated as there may have been a malicious altering of the encrypted second dataset.

If the first hash value does equal the unique identifier as stored within the decentralized database then process 1400 moves to 1430 and the system receives, from the user associated with the second key, a decryption key. Once it has been determined that the encrypted second dataset has not been modified, the system may decrypt the encrypted second dataset to generate the decrypted second dataset.

At 1435, the system verifies, based on the decrypted second dataset, the result. The decrypted second dataset may reveal sensor data including personally identifiable information that may be utilized to verify a result of a user session. For example, a verification request may request the system to verify that a particular user removed 2 particular items from a particular area. A merchant may control access to an encrypted first dataset that shows a person removing the 2 particular items from the particular area. However, because personally identifiable information is removed from the first dataset it may not be possible to identify the person that removed the 2 particular items. On the other hand, the second dataset may contain personally identifiable information that is missing from the first dataset. Thus, the second dataset may be utilized to confirm the identity of the person removing the 2 particular items from the particular area. However, because a user may control access to the second dataset (via an encryption key) the system may first check that the second dataset has not been altered by utilizing a unique identifier that has been previously stored in a decentralized database. Thus, process 1400 allows results from a user session to be verified, while allowing a user to control his own personally identifiable information, while also preventing the user from maliciously modifying sensor data containing his own personally identifiable information for malicious gain. Although process 1400 has been described utilizing the second dataset any aspect of a user session (e.g., AIDC, exit time, entry time, etc.) may utilized to verify a result or any other aspect of a user session.

In one embodiment, an oracle or a reviewer may perform one or more operations of block 1435. For example, an oracle or reviewer may be used to verify a result based on one or more data points (e.g., the decrypted second dataset). In one embodiment, there may be multiple oracles that may need to reach consensus on the verification of a result based on one or more data points. For example if 2 out of 3 oracles verify a result then the result is verified. The oracle(s) may be compensated (e.g. by a digital asset) for performing the verification process. The amount of compensation may be based on the accuracy and/or timeliness of the verification. For example, if an oracle verifies a result within a few minutes after the oracle receives a verification request, then the oracle may be compensated more than if the oracle verifies the same result within a few hours after the oracle has received the verification request. An oracle's compensation may be tied to other factors, such as the amount of sensor data (or other data points) that must be utilized to verify a transaction. In one embodiment, when there are multiple oracles each oracle may verify a result based on a different data point. For example, a first oracle may verify a result based on a decrypted second dataset. However, another oracle may verify the same result based on decrypted AIDC data associated with the same user session. In such an example, the multiple oracles may come to consensus (e.g., simple majority, super majority, etc.) on a result in order to verify a result by different data points. In one embodiment, multiple oracles may each verify a result based on a variation of the same data point. For example, a first oracle may verify a result based on first sensor data within a decrypted second dataset. However, another oracle may verify the same result based on second sensor data within the decrypted second dataset. In such an example, the first sensor data may indicate video data from a first camera and/or video data at a first time and the second sensor data may indicate video data from a second camera and/or video data at a second time. The first and second cameras may be positioned at different locations and provide different viewing angles within an area.

In one embodiment, a group of oracle or reviewers may be implemented by remote connected computing devices. The oracle may verify a result based on various machine specific techniques. For example, an oracle may verify a result based on a decrypted second dataset, by performing facial recognition to identify a user and object recognition to detect objects removed from an area.

What is claimed is:

1. A system for a mechanized store having one or more displays in an area and a plurality of items at the one or more displays, the system comprising:
   one or more sensors configured to identify one or more items of the plurality of items;
   one or more cameras configured to detect identities of the one or more items removed by a user from the one or more displays; and
   one or more processors configured to:
      receive identities of the one or more items identified by the one or more sensors;
      receive identities of the one or more items detected by the one or more cameras;
      compare the identities of the one or more items identified by the one or more sensors to the identities of the one or more items detected by the one or more cameras to obtain a result; and
      save the result to a record of the user.

2. The system of claim 1, wherein the one or more sensors comprise an RFID (Radio Frequency Identification) tag reader.

3. The system of claim 1, wherein the one or more sensors comprise an optical scanner.

4. The system of claim 1, wherein the one or more sensors comprise an image sensor.

5. The system of claim 1, wherein the processors are configured to identify the user based on images from the one or more cameras.

6. The system of claim 1, wherein a structure is configured to permit only one user at a time access to the area.

7. The system of claim 1, wherein the area is a volume less than 3.5 meters wide by 3.5 meters long by 3.5 meters tall.

8. The system of claim 1, wherein the one or more cameras are configured to detect an identity of an item of the one or more items by identifying movement of a hand and determining if the hand is holding the item of the one or more items.

9. The system of claim 1, further comprising a wireless receiver configured to unlock doors of a structure based on a received signal from a device of the user.

10. The system of claim 1, wherein the processors are configured to identify the user based on images from the one or more cameras prior to a start of a user session.

11. The system of claim 1, wherein:
   the one or more processors are configured to update a first electronic basket and a second electronic basket;
   the first electronic basket corresponds to the one or more items identified by the one or more sensors; and
   the second electronic basket corresponds to the one or more items removed by the user detected by the one or more cameras.

12. A method for operating a mechanized store, the method comprising:
   permitting a user access to an area, the area having a plurality of items at one or more displays in the area;
   identifying one or more items of the plurality of items using one or more sensors;
   detecting the identity of the one or more items removed by the user from the one or more displays using one or more cameras;
   comparing identities of the one or more items identified by the one or more sensors to identities of the one or more items detected by the one or more cameras to obtain a result; and
   saving the result to a record of the user.

13. The method of claim 12, further comprising transmitting the result to a mobile device of the user.

14. The method of claim 12, further comprising alerting a store owner, a store employee, an independent contractor, and/or law enforcement based on the result.

15. The method of claim 12, further comprising tracking the user in the area.

16. The method of claim 12, further comprising initiating a credit card transaction on a credit card associated with an account of the user, such that the user is charged for the one or more items removed.

17. One or more memory devices comprising instructions that, when executed, cause one or more processors to perform the following steps:
   permitting a user access to an area, the area having a plurality of items at one or more displays in the area;
   identifying one or more items of the plurality of items using one or more sensors;
   detecting the identity of the one or more items removed by the user from the one or more displays using one or more cameras;
   comparing identities of the one or more items identified by the one or more sensors to identities of the one or more items detected by the one or more cameras to obtain a result; and
   saving the result to a record of the user.

18. The one or more memory devices of claim 17, wherein the instructions, when executed, further cause the one or more processors to perform the following steps:
   identifying a discrepancy between the identities of the one or more items identified by the one or more sensors and the identities of the one or more items detected by the one or more cameras; and
   determining that the discrepancy falls within a certain monetary value range.

19. The one or more memory devices of claim 17, wherein the one or more sensors comprise an image sensor.

20. The one or more memory devices of claim 17, wherein the instructions, when executed, further cause the one or more processors to perform the following step: transmitting the result to a mobile device of the user.

* * * * *